US007987277B2

(12) United States Patent
Endo et al.

(10) Patent No.: US 7,987,277 B2
(45) Date of Patent: Jul. 26, 2011

(54) SAFETY INFORMATION TRANSMISSION DEVICE

(75) Inventors: Tomotaka Endo, Kawasaki (JP); Kazumasa Takeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 248 days.

(21) Appl. No.: 12/232,153

(22) Filed: Sep. 11, 2008

(65) Prior Publication Data

US 2009/0037547 A1 Feb. 5, 2009

Related U.S. Application Data

(63) Continuation of application No. PCT/JP2006/305010, filed on Mar. 14, 2006.

(51) Int. Cl.
*G06F 15/16* (2006.01)
*H04M 11/04* (2006.01)

(52) U.S. Cl. .................................... 709/229; 455/404.1

(58) Field of Classification Search .................. 709/237, 709/201-202, 206, 218, 229; 713/186; 726/2-4, 726/17-21; 455/404.1; 715/808-813
See application file for complete search history.

(56) References Cited

U.S. PATENT DOCUMENTS 7,308,246 B2 * 12/2007 Yamazaki et al. ......... 455/404.1
7,591,413 B1 * 9/2009 Block et al. ................... 235/379
2005/0151642 A1 * 7/2005 Tupler et al. ............. 340/539.18
2007/0081540 A1 * 4/2007 Crowell et al. ............ 370/395.1
2008/0013484 A1 * 1/2008 Chang et al. .................. 370/328

FOREIGN PATENT DOCUMENTS

JP 2001-222783 8/2001
JP 2003-271747 9/2003
JP 2004-005055 1/2004
JP 2004-013831 1/2004
JP 2004-234415 8/2004
JP 2005-080211 3/2005
JP 2005-266859 9/2005
JP 2006-031226 2/2006

OTHER PUBLICATIONS

Japanese Notice of Reason for Rejection issued in Application No. 2008-504959, dated Nov. 4, 2009.

* cited by examiner

*Primary Examiner* — Joseph E Avellino
*Assistant Examiner* — Chirag Patel
(74) *Attorney, Agent, or Firm* — Fujitsu Patent Center

(57) ABSTRACT

A safety information transmission device includes a reception unit that receives, via a network, safety information indicating whether or not a user is safe, the safety information being received by an information processing terminal if biometric authentication of the user is successful, and a control unit that determines, when a contact method is a contact by an electronic message and a contact destination address is an electronic message address, to transmit the electronic message containing the safety information to the electronic message address.

13 Claims, 19 Drawing Sheets

SAFETY INFORMATION TRANSMISSION DEVICE

CROSS-REFERENCE TO RELATED APPLICATION

This is a continuation of application PCT/JP2006/305010, filed on Mar. 14, 2006, now pending, the contents of which are herein wholly incorporated by reference.

BACKGROUND OF THE INVENTION

This idea relates to a safety information transmission device that assists a user in transmitting safety information to a contact destination in time of disaster or the like.

Technique that is currently used for safety confirmation (communication of safety information) in time of disaster includes a "disaster message board service" and the like, which use fixed-line telephones or mobile phones. However, in time of disaster, there is a possibility of not being able to communicate safety information in a timely manner due to increased traffic.

It is necessarily to realize timely communication of the safety information in time of disaster by using not only such a safety confirmation system that relies solely on a telephone service but also a safety confirmation system in which a terminal having a biometric authentication function operates in cooperation with an online network and the like of a bank and the like.

As a method for realizing the timely communication of the safety information, for example, there is described a technology in Patent Document 1. Patent Document 1 describes a method of allowing, upon detection of occurrence of an emergency, an incoming call from and communication with a prestored specific other station.

The following is a related art to the idea.

[Patent document 1] Japanese Patent Laid-Open Publication No. 2001-222783

However, the technology described in Patent Document 1 is a method that relies on the telephone service. Accordingly, in a situation of increased traffic or under communication control aiming at securing priority communication for emergency contacts to a hospital, a fire station, a police station, a local government, and the like in time of disaster, there is a possibility that a general user cannot communicate the safety information or a possibility that the communication is delayed.

SUMMARY OF THE INVENTION

An object of the idea is to provide a technology that enables the user to communicate the safety information more accurately at the time of occurrence of a disaster or the like. The idea adopts the following configuration in order to achieve the aforementioned object.

To be specific, the idea relates to a safety information transmission device including: a reception unit that receives, via a network, safety information indicating whether or not a user is safe, the safety information being received by an information processing terminal if biometric authentication of the user is successful; a storage unit that stores user information containing a contact method of the safety information with respect to a contact destination specified by the user, and a contact destination address corresponding to the contact method; a control unit that determines, when the contact method is a contact by an electronic message and the contact destination address is an electronic message address, to transmit the electronic message containing the safety information to the electronic message address; and a transmission unit that transmits the electronic message to the electronic message address in accordance with the determination of the control unit.

According to the idea, the safety information is notified to the contact destination by means of the electronic message, which is different from a telephone service. As a result, it becomes possible to avoid a situation where the safety information is not transmitted smoothly due to increased telephone traffic at the time of occurrence of a disaster. In other words, notification of the safety information to the contact destination can be performed promptly.

Preferably, according to the idea, the reception unit receives the safety information received by an automated transaction device that serves as the information processing terminal. According to the idea, it is preferable to apply the automated transaction device as the information processing terminal. The application of the automated transaction device enables the user to communicate the safety information through the nearest automated transaction device when the user encounters a disaster away from home.

Preferably, according to the idea, the reception unit receives the safety information received by the information processing terminal via a screen information providing device that provides screen information for allowing the user to input the safety information to the information processing terminal. In this manner, according to the idea, the safety information can be transmitted to the safety information transmission device via the screen information providing device (e.g., web server) through the information processing terminal that the user possesses, and then can be notified to the contact destination from the safety information transmission device.

Preferably, according to the idea, the reception unit receives the safety information that is input by a substitute person different from the user, the safety information being received by the information processing terminal with an alternative operation to the biometric authentication being used as a condition. As a result, it becomes possible to notify the safety information input by the substitute person when the user himself/herself cannot input the safety information through the information processing terminal.

Preferably, according to the idea, the control unit determines, when the safety information indicates that the user is injured, to communicate the safety information to another contact destination different from the contact destination specified by the user. Alternatively, the control unit determines, when the safety information indicates that there is an injured/sick person around the user, to communicate the safety information to another contact destination different from the contact destination specified by the user.

By contacting such institutions as a hospital, a fire station, a police station, and a local government as the different contact destinations, each institution can ensure a prompt response.

The idea relates to a program for causing a computer to function as the aforementioned safety information transmission device and a non-transitory computer readable medium recorded with such a program.

According to the idea, it becomes possible for a user to communicate safety information more appropriately at the time of occurrence of a disaster or the like.

DETAILED DESCRIPTION OF THE PREFERRED EMBODIMENTS

Outline of the Invention

Figure 1:
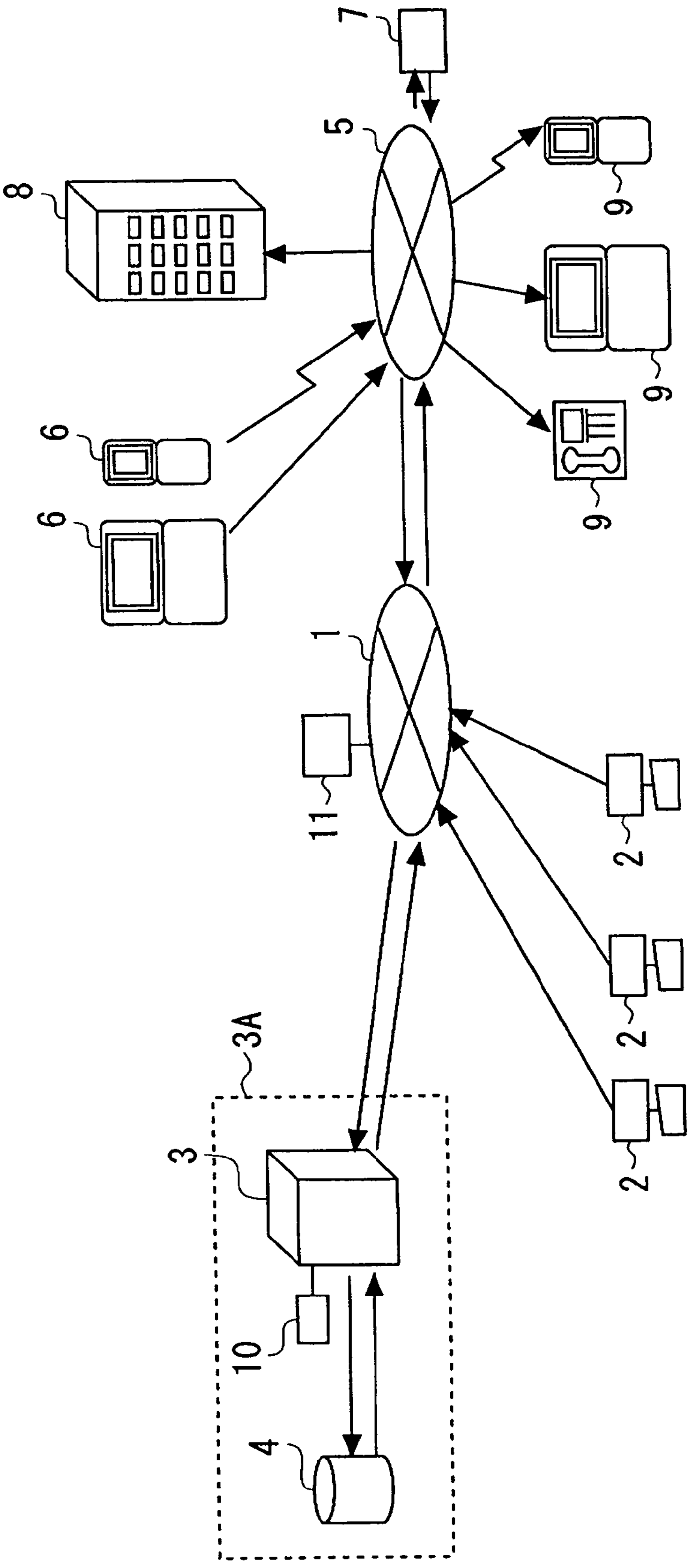
FIG. 1 is a diagram illustrating an example of an overall configuration of a safety confirmation system.

The details of the problems that the idea is to address are as follows.

(1) To enable a timely communication of safety information (safety confirmation information) in time of disaster.

(2) To alleviate traffic increase on a telephone service side by establishing a contact means of the safety information that does not rely solely on the telephone service.

(3) To make available such a contact means of the safety information as to meet the need by performing personal confirmation with a biometric authentication function.

(4) To enable accurate communication of an own place with respect to a contact destination by using location information of a terminal in communicating the safety information, even if a user is struck by a disaster in an unfamiliar place while traveling, on a business trip, or the like.

(5) To enable, when a state (presence/absence of wound (injury) or the like) of the user himself/herself, presence/absence of an injured/sick person nearby, or the like has been input, prompt rescue and treatment by transmitting the information to respective institutions such as a hospital, a fire station, a police station, a local government, and the like.

(6) To enable, when the user himself/herself cannot communicate the safety information due to injury or the like, substitute communication by a third party.

(7) To use an online network constantly monitoring an operation state of an automated transaction device such as an automated teller machine (ATM) terminal or a CD terminal in order to provide, when the automated transaction device has been disconnected from the network due to a disaster, the location information of the automated transaction device to the respective institutions (emergency contact destinations) including a local government and the like, which results in assisting prediction of a disaster-stricken area or scale and a search or rescue activity.

The safety confirmation system according to the idea is provided with the following functions (A) to (G) in order to realize a safety confirmation method that addresses the aforementioned problems (1) to (7) with the biometric authentication.

(A) Subscription to Safety Information Service (Registration Function of Customer Information)

The safety confirmation system is provided with a customer information registration function that enables the user to register with a safety information service as a subscriber with respect to a customer information database (customer information DB) of a network center in advance. Information to be registered includes, for example, such information as follows.

Example 1

Contact method of safety information (registration with disaster message board, notification by E-mail, telephone communication, and the like)

Example 2

Contact destination of safety information (e.g., telephone number, E-mail address, and mobile phone mail address)

Example 3

Classification of contact destination (e.g., contact destination in a case where safety confirmation (safety information transmission) by in-person authentication is performed, and contact destination in a case where third party performs safety confirmation on behalf of user)

The registration function of the customer information is configured so that a plurality of contact methods of the safety information and a plurality of items of the safety information can be set (registered). Further, the registration function is configured so that the contact method and type are set (registered) on a contact-destination basis.

(B) Mode Setting at Time of Occurrence of Disaster (Shift-Instruction-to-Disaster-Mode Output Function)

The safety confirmation system is provided with a shift-instruction-to-disaster-mode output function that issues, from the network center, an instruction to cause the automated transaction device located in the disaster-stricken area to shift to the disaster mode at the time of occurrence of a disaster.

The shift-instruction-to-disaster-mode output function can output an instruction that instructs a personal computer (PC) or a mobile terminal, with which the user uses Internet banking or mobile banking, to shift to an operation in the disaster mode.

The automated transaction device, the PC, and the mobile terminal (hereinafter, also referred to as "user side control terminal") have a function that receives, in the disaster mode, such information inputs as personal confirmation through authentication, presence/absence of injury or the like of the user due to a disaster, and presence/absence of an injured/sick person nearby, as well as a normal transaction function.

Further, the user side control terminal has a function (substitute function) that enables, when the user cannot perform the authentication or transmission of the safety information due to injury or the like, the third party to perform those procedures on behalf of the user.

(C) Reception of Safety Information by Automated Transaction Device

The user in the disaster-stricken area performs in-person authentication with the automated transaction device having the biometric authentication function. The automated transaction device has a function that receives such information inputs as a state (presence/absence of injury or the like) of the user and presence/absence of an injured/sick person nearby after completion of the authentication.

The automated transaction device may have a function that enables, when the user cannot perform procedures (operations) from the authentication until safety information transmission due to injury or the like, the transmission of the safety information through an operation of the automated transaction device by the substitute person of the user.

Further, the automated transaction device may have a function that realizes such an operation method where, like a normal operation in performing a transaction such as depositing and transfer, information necessary for the authentication and the transmission of the safety information is input, and then "confirm" of the screen is pressed to complete reception.

(D) Reception of Safety Information by Personal Computer/Mobile Terminal

The information processing terminal is provided with a function that performs, in a case where the user transmits the safety information through a personal information processing terminal such as a personal computer and a mobile terminal, personal confirmation by the biometric authentication with that terminal, and enables reception of the safety information through access to a predetermined site such as Internet banking or mobile banking after that confirmation is finished.

At that stage, by transmitting the location information (cell information) of the information processing terminal along with the safety information, it becomes possible to notify (identify current location of user from location information) the current location of the user.

(E) Determination of Safety Information

The information (safety information) input through the automated transaction device is received by the network center. The network center is provided with a function that performs a determination based on the safety information. The determination contents may include a type (user himself/herself or substitute person) of a person who has accessed (transmitted authentication information) the network center, presence/absence of injury or the like of the user, and presence/absence of an injured/sick person nearby.

(F) Communication of Safety Information

The network center is provided with a function that performs, in accordance with the determination result of the safety information, communication in the following manner.

Example 1

Case where access is made by the user himself/herself and there is no injury or the like of the user nor injured/sick person nearby In this case, the safety information (state of user, location information, and the like) is communicated, according to the specified contact method, with respect to the contact destination that is registered at the time of subscription to the safety information service and is allowed for a case of in-person access.

Example 2

Case where access is made by the user himself/herself and there is injury or the like of the user or an injured/sick person nearby.

In this case, in addition to the communication of Example 1 described above, communication to such institutions (hereinafter, also referred to as "emergency contact destinations") as a hospital, a fire station, a police station, a local government, and the like is performed to make a request for rescue and the like.

Example 3

Case where access is made by substitute person instead of the user himself/herself In this case, the safety information is communicated, according to the specified contact method, with respect to the contact destination that is registered at the time of subscription to the safety information service and allowed even for a case of substitute person access. Further, the communication to the emergency contact destination is performed to make a request for rescue and the like. In a case where the communication by the substitute person access is not allowed, only the communication to the emergency contact destination is performed.

(G) Provision of Information for Predicting Disaster-Stricken Area by Monitoring Operation State Using a characteristic of the online network of a financial institution (bank or the like) where the operation state of the automated transaction device is constantly monitored, when any automated transaction device disconnected from the network is detected after the shift to the disaster mode, the location information thereof is provided to the emergency contact destination.

With the safety confirmation system using the biometric authentication and the safety confirmation method provided by that system according to the idea, the user registers the contact method and the contact destination of the safety information in the system as the customer information in advance in case of disaster. At the time of occurrence of a disaster, the automated transaction device located in the disaster-stricken area receives the shift-to-disaster-mode instruction from the network center, and shifts to the disaster mode. In the disaster mode, in addition to the case of the normal transaction, the automated transaction device performs personal identification by the biometric authentication, and, in response to the identification result, performs prompt communication of the safety information according to the registration information.

On the other hand, with the information processing terminal having the biometric authentication function, such as a personal computer and a mobile terminal, by accessing a site of such online banking as Internet banking or mobile banking after the in-person authentication by the biometric information, the communication of the safety information can be performed in the same manner as the case of using the automated transaction device.

Further, it becomes possible to support rescue and prediction of the disaster-stricken area by adopting such a method that notifies the state of the user, and presence/absence of an injured/sick person nearby at the time of authentication, and determines presence/absence of the automated transaction device that has been disconnected from the network to provide the determination to the relevant institution (emergency contact destination).

With the aforementioned technology described in Patent Document 1, when occurrence of an emergency is detected, an incoming call from and communication with a prestored specific other station are conducted. However, under a communication restriction situation for securing priority communication, which results from the increased traffic situation in time of disaster, there is a possibility that the communication of the safety information cannot be performed promptly. Further, even though the incoming call from and communication with the specific other station are secured, there is a possibility that the user finds it difficult to communicate an accurate own location (being in an unfamiliar place while traveling, on a business trip, or the like). According to the idea, by using a system where a terminal having a biometric authentication function, an online network, and a public network cooperate with one another, it becomes possible to communicate the safety information promptly even in a situation where the safety communication method by the telephone service is difficult to use.

In addition, because the location information and the operation state of the automated transaction device are constantly monitored by the online network, even if the user himself/herself cannot identify the location accurately, it is possible to communicate the accurate location only by the authentication through the automated transaction device.

Further, in a case where the user uses the information processing terminal as a tool for notifying the safety information, it is possible to notify the contact destination of information of the cell where that information processing terminal is located, as the location information of the user.

Further, in a case where the automated transaction device has been disconnected from the network, the network center detects abnormality of the automated transaction device, and the location information thereof is provided to the relevant institution (emergency contact destination) for disaster countermeasures, thereby enabling making a request for rescue, search, and the like.

Operations required of the user for using the safety confirmation system include advance procedures (setting of contact method and contact destination) for subscribing to the service, and inputs of in-person or substitute authentication and additional information (state of user, presence/absence of injured/sick person nearby, and the like) in time of disaster. Those operations are easy operations that can be performed with the automated transaction device. Thus, it is possible to set the information necessary for the communication promptly and to notify a predetermined contact destination (including emergency contact destination depending on situation). Accordingly, the idea is extremely effective as the safety confirmation method in time of disaster.

Embodiment of the Idea

Hereinbelow, with reference to the drawings, an embodiment of the idea is described. The configuration of the embodiment is illustrated by way of example, and the idea is not limited to the configuration of the embodiment.

Overall Configuration

FIG. 1 is a diagram illustrating an example of an overall configuration of a safety confirmation system according to the embodiment of the idea. In FIG. 1, an online network 1 accommodates a plurality of ATM terminals (automated transaction devices) 2 that are installed in such a financial institution as a bank, and a safety confirmation network server 3 (hereinafter, referred to as "server 3": safety information transmission device) that constantly monitors a state (e.g., operation state of each ATM terminal 2) of the online network 1. The server 3 is placed in a network center 3A.

The server 3 is connected with a customer DB 4 in which information concerning a customer (user: subscriber to safety confirmation service) is registered. The customer DB 4 can be accommodated in the server 3, or can be placed in a DB server (not shown) different from the server 3.

The online network 1 is connected with a public network (fixed-line telephone network, mobile phone network, and the Internet) 5. With the public network 5, connected is a terminal device (information processing terminal) 6 of the user (subscriber to safety confirmation service). The terminal device 6 (hereinafter, referred to as "user terminal 6") represents a fixed terminal or a mobile terminal, such as a PC or a mobile phone having a biometric authentication function.

Further, the public network 5 is connected with a web server 7 that provides to the user an environment (web site) for use of online banking, such as Internet banking or mobile banking, which is provided by the financial institution. The user uses the user terminal 6 to connect to the public network 5, and accesses a web site of the web server 7, whereby the user can use the online banking. The web server 7 can be provided in such a manner that the web server 7 is connected with the online network 1.

Further, the public network 5 is connected with a communication terminal (not shown) of each institution (emergency contact destination) 8, such as a government, a local government, a fire station, a police station, a hospital, or the like, which should be notified of occurrence of a disaster in time of disaster. The communication terminal represents, for example, a fixed-line telephone, a mobile phone, or an information processing terminal. Further, the public network 5 is connected with a communication terminal 9 of a contact destination to which the user should communicate safety confirmation in time of disaster.

Configuration of Server

Figure 2:
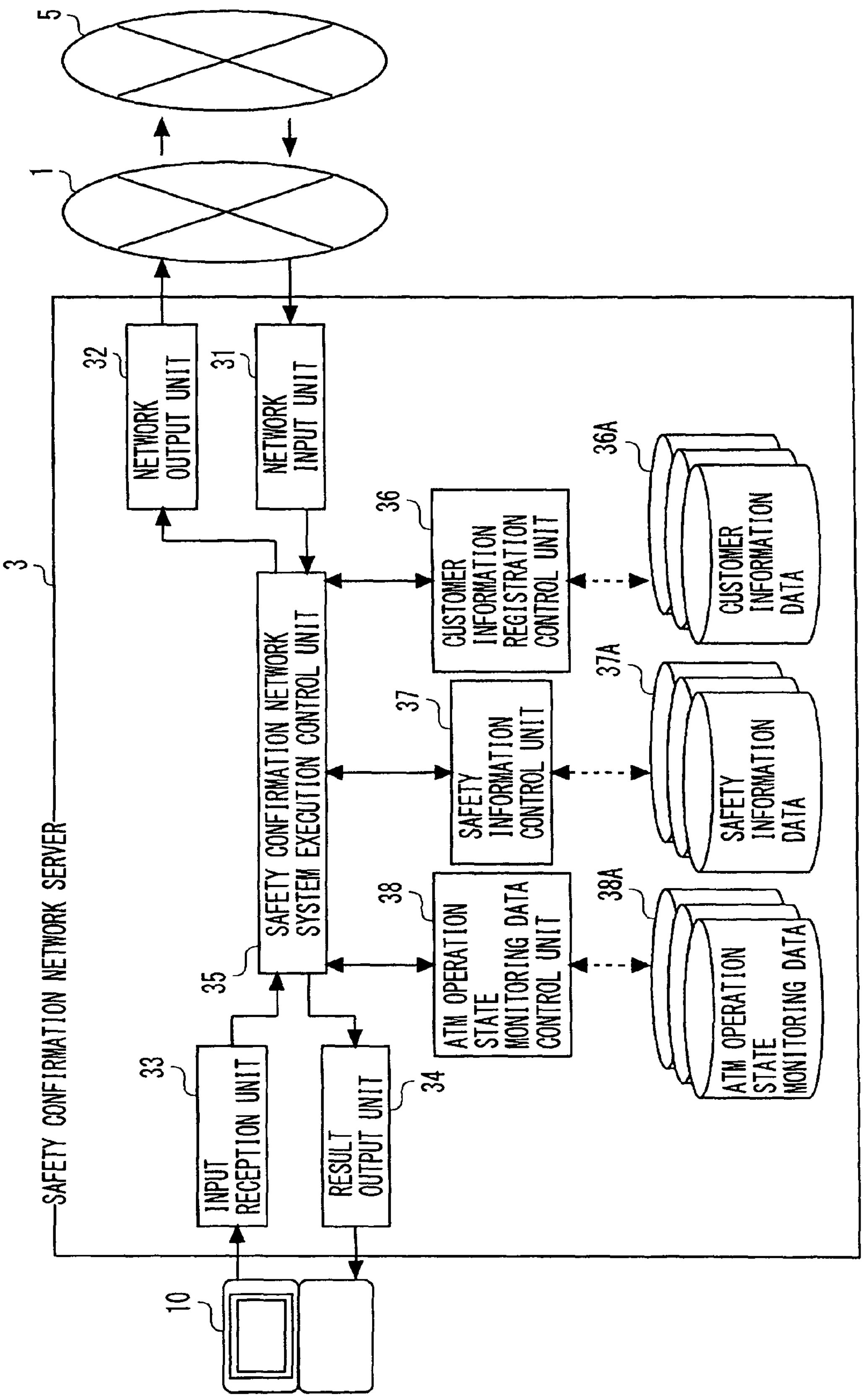
FIG. 2 is a diagram illustrating a configuration example of a safety confirmation network server (safety information transmission device) illustrated in FIG. 1.

FIG. 2 is a functional block diagram of the server 3 that is placed in the network center. The server 3 is the information processing terminal (computer) including a CPU (central processing unit), a memory (storage device: storage unit), an input/output interface, a communication interface, and the like.

In FIG. 2, the server 3 includes a network input unit 31 and a network output unit 32, which are connected with the online network 1. Further, the server 3 includes an input reception unit 33 and a result output unit 34, which are connected with a control terminal 10 of the server 3.

Further, the server 3 includes a safety confirmation network system execution control unit 35 (hereinafter, referred to as "execution control unit 35": corresponding to control unit of the idea) that is connected with the network input unit 31, the network output unit 32, the input reception unit 33, and the result output unit 34. A customer information registration control unit 36, a safety information control unit 37, and an ATM operation state monitoring data control unit 38 (hereinafter, referred to as "monitoring data control unit 38") are connected with the execution control unit 35.

The customer information registration control unit 36 is connected with a customer information DB 36A, the safety information control unit 37 is connected with a safety information DB 37A, and the monitoring data control unit 38 is connected with an ATM operation state monitoring DB 38A. The customer information DB 36A and the safety information DB 37A correspond to the customer DB 4 illustrated in FIG. 1.

The network input unit 31 deals with information reception from the online network 1, whereas the network output unit 32 deals with information transmission to the online network 1. The network input unit 31 and the network output unit 32 are realized using communication interfaces.

The input reception unit 33 deals with information reception from the control terminal 10, whereas the result output unit 34 deals with information transmission to the control terminal 10. The input reception unit 33 and the result output unit 34 are realized using the communication interfaces.

The execution control unit 35, the customer information registration control unit 36, the safety information control unit 37, and the monitoring data control unit 38 are functions that are realized by the CPU executing programs stored in the memory. The customer information DB 36A, the safety information DB 37A, and the ATM operation state monitoring DB 38A are stored in the memory (storage unit).

The execution control unit 35 performs control (information transmission, processing instruction output, and the like) of the respective units that are connected with the execution control unit 35 itself. The customer information registration control unit 36 deals with registration (storage)/readout of customer information with respect to the customer information DB 36A according to an instruction from the execution control unit 35. The safety information control unit 37 deals with registration (storage)/readout of the safety information with respect to the safety information DB 37A according to an instruction from the execution control unit 35. The monitoring data control unit 38 deals with registration/readout of information with respect to the ATM operation state monitoring DB 38 according to an instruction from the execution control unit 35.

Data Structure

Figure 3:
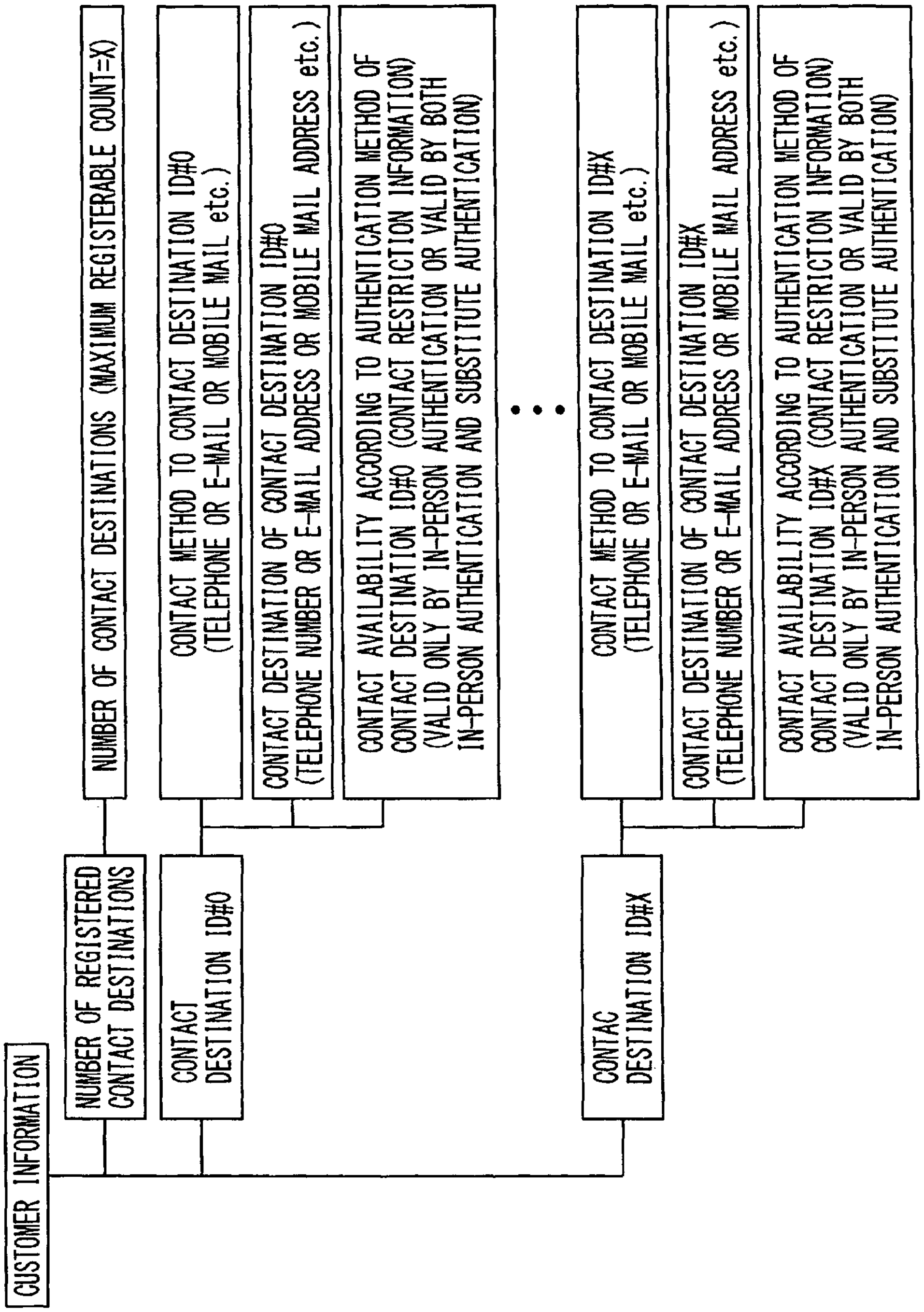
FIG. 3 is a diagram illustrating a structural example of customer information (user information) stored in a customer information database.

FIG. 3 is a diagram illustrating an example of a data structure of the customer information data registered in the customer information DB 36A. The customer information data is created for each user. FIG. 3 illustrates the customer information data for one user.

The customer information data contains, for each customer (user), that is, each subscriber to the safety confirmation service, the number of registered contact destinations and identification information (ID number) of one or more contact destinations. The number of the registered contact destinations is linked with the number of the one or more contact destinations (maximum value=X) that should be notified of the safety information when the user is struck by a disaster.

The ID number of the contact destination is linked with a contact method for the contact destination (telephone, E-mail, mobile phone mail, or the like), an address of the contact destination (telephone number, E-mail address, mobile phone mail address, or the like), and contact availability according to an authentication method (contact restriction information: valid only by in-person authentication, valid by both in-person authentication and substitute authentication, or the like). The E-mail and the mobile phone mail are collectively referred to as "electronic message".

Figure 4:
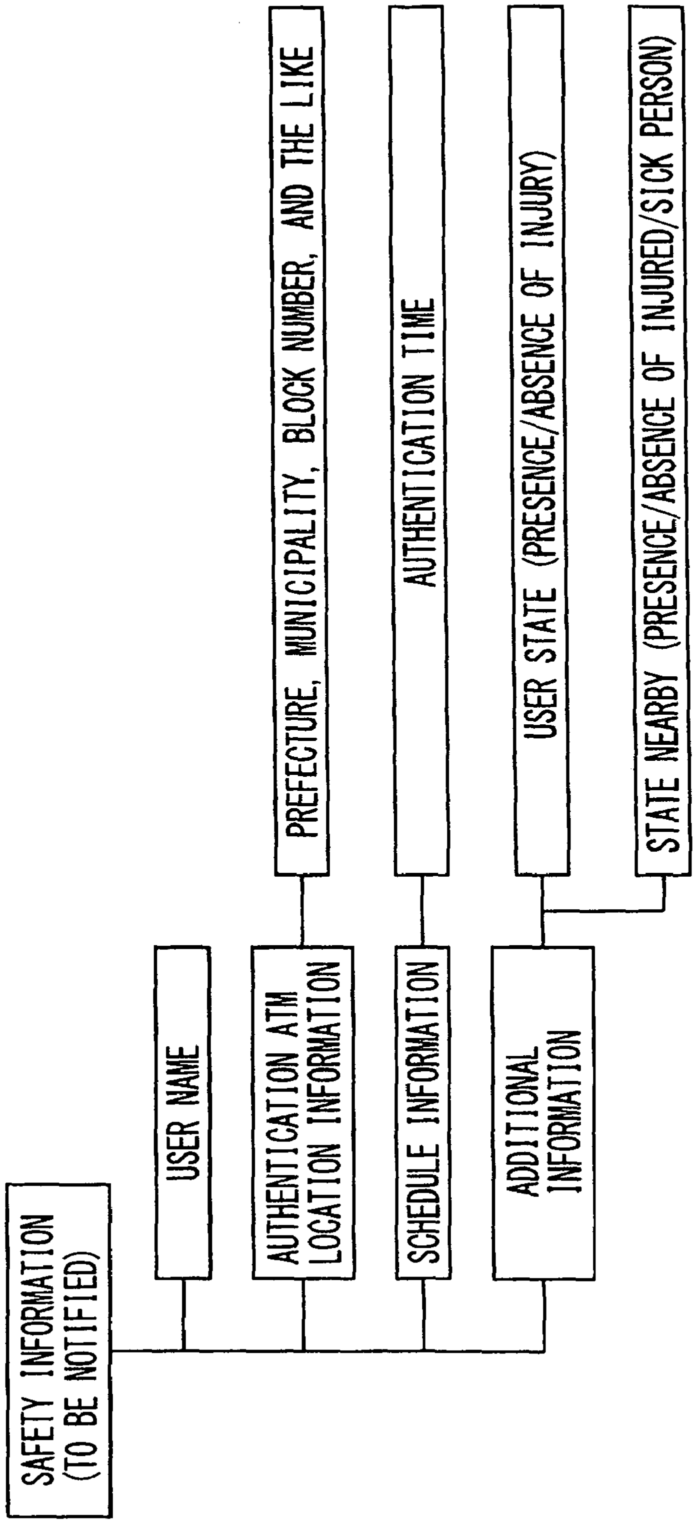
FIG. 4 is a diagram illustrating a structural example of safety information stored in a safety information database.

FIG. 4 is a diagram illustrating an example of a data structure of the safety information DB 37A. Illustrated in FIG. 4 is the safety information (safety confirmation information) to be notified to the contact destination. The safety information contains a user name, authentication ATM location information, schedule information, and additional information. The authentication ATM location information contains the address (prefecture, municipality, block number, and the like) of an ATM terminal as location information of the ATM terminal with which the user or the substitute person thereof has performed an authentication processing. The schedule information contains a time (authentication time) at which the authentication is conducted. The additional information contains a user state (presence/absence of injury) and a state nearby (presence/absence of injured/sick person).

The ATM operation state monitoring DB 38A stores, to give an example, for each are a, information (not shown) that indicates the identification information (ID) of one or more ATM terminals 2 located in the are a, the network address of the ATM terminal 2, the location information of the ATM terminal 2, and the operation state (operating (OK)/not operating (NG)) of the ATM terminal 2. The state where the ATM terminal 2 is not operating indicates, for example, a situation where the ATM terminal 2 is disconnected from the network.

ATM Terminal

Next, the configuration of the ATM terminal 2 is described. The ATM terminal 2 is configured of a teller mechanism for bills and coins, user interfaces (input device and display device), a communication device (communication interface or the like), a biometric information detection device, control devices (including CPU, memory, input/output interface, and the like), and the like (not shown).

The user interface is configured, for example, with use of a display 21 having a touch panel, thereby allowing the user to input desired information through pressing a displayed key or button according to a display content displayed on the display 21. Display control with respect to the display 21 and reception of input information are performed by the control device.

Figure 5:
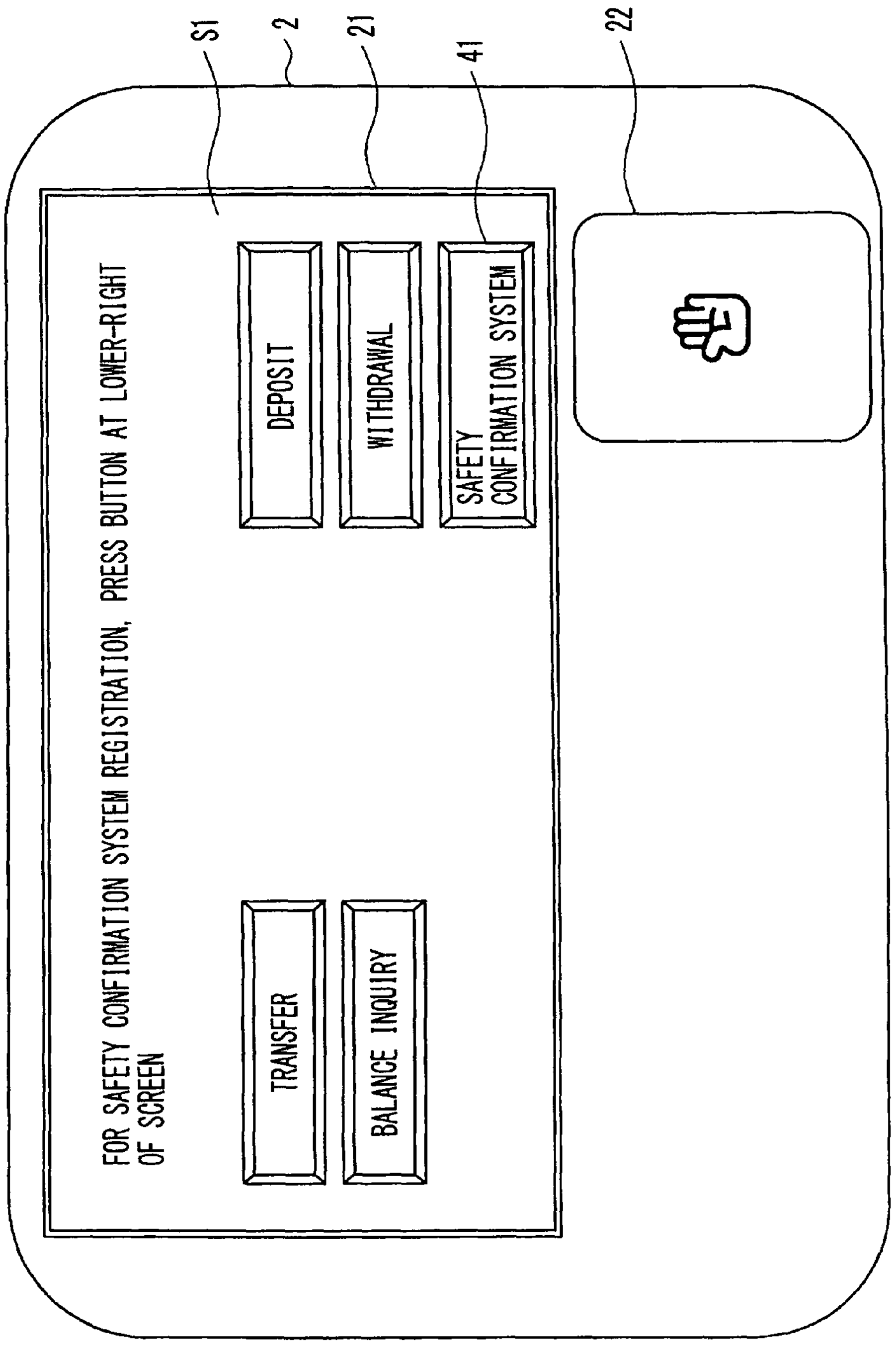
FIG. 5 is a diagram illustrating an example of a screen display during a normal mode, which is displayed on an ATM terminal (information processing terminal: automated transaction device)

FIGS. 5 to 8 illustrate examples of display screens of the display 21. FIG. 5 is a diagram illustrating an example of the display screen displayed on the display 21 when the ATM terminal 2 is in normal operation. Referring to FIG. 5, on a display screen S1, in addition to such buttons used for normal transactions as "TRANSFER" and "DEPOSIT", a button 41 of "SAFETY CONFIRMATION SYSTEM" is provided. The user can input and register the customer information (contact method, contact destination, and the like) through pressing the button 41 of "SAFETY CONFIRMATION SYSTEM" according to a guidance of the display screen S1, which is displayed during the normal mode.

In the vicinity (in FIG. 5, lower portion of display 21) of the display 21, a sensor that detects the biometric information of the user is provided as the biometric information detection device. In the example illustrated in FIG. 5, illustrated is a biometric information sensor (vein sensor) 22 that detects palm veins of the user as the biometric information. With use of the biometric information detected by the biometric information sensor 22, it is judged whether or not the user is authentic (subscriber). It should be noted that, as the biometric information sensor 22, a sensor that detects other biometric information than veins, such as fingerprints or an iris, instead of veins can be employed. Further, such configuration that detects more than two kinds of biometric information for authentication may be employed.

Figure 6:
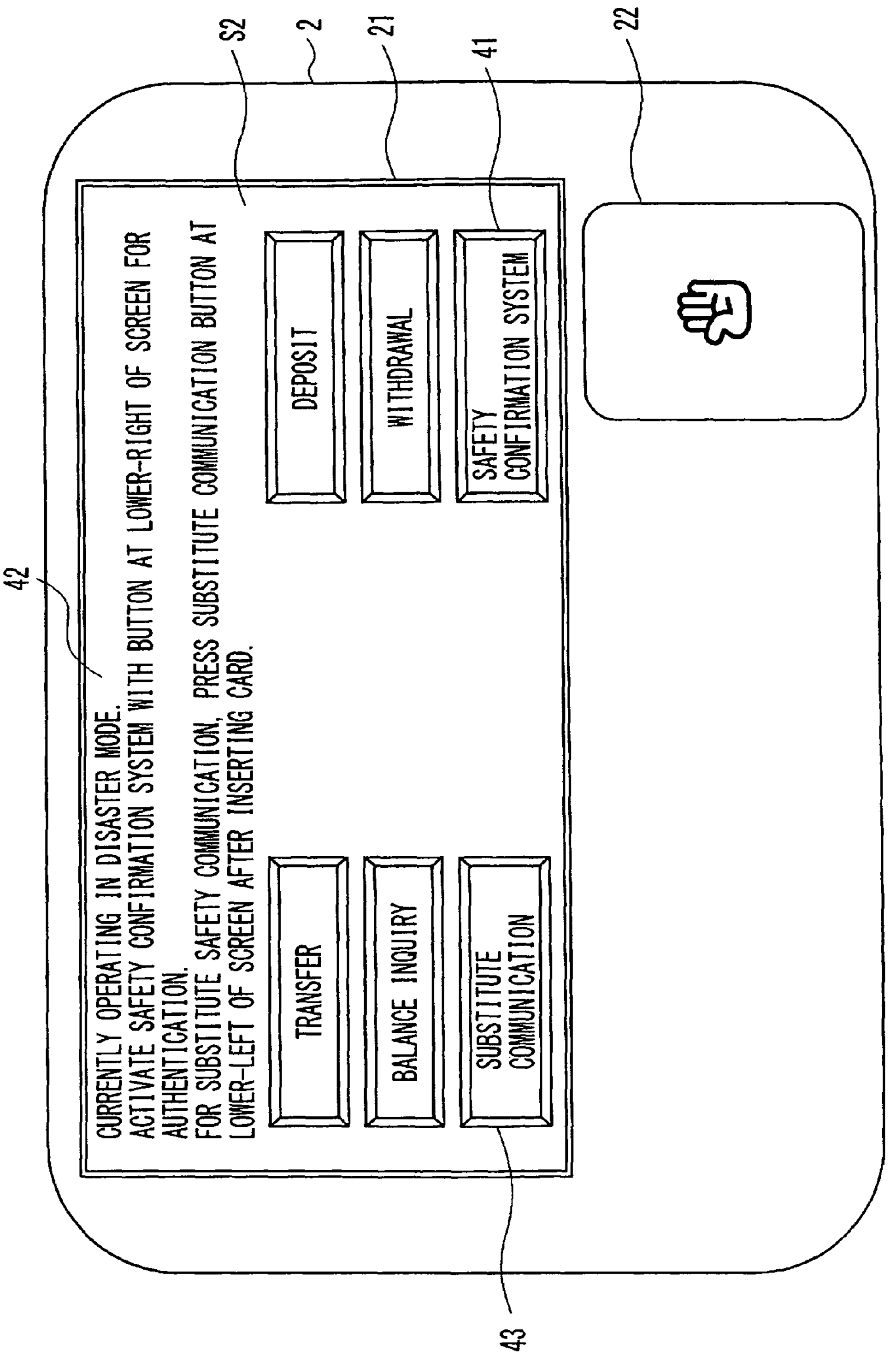
FIG. 6 is a diagram illustrating an example of a screen display during a disaster mode, which is displayed on the ATM terminal.

FIG. 6 is a diagram illustrating an example of the display screen during a disaster mode. Referring to FIG. 6, in a display screen S2 displayed on the display 21, displayed are a guidance 42 indicating that the ATM terminal 2 is operating in the disaster mode, the button 41 of "SAFETY CONFIRMATION SYSTEM" that enables the user to notify the safety information after the in-person authentication, a button 43 of "SUBSTITUTE COMMUNICATION" that enables the substitute person, who is not the user, to notify the safety information in place of the user.

Figure 7:
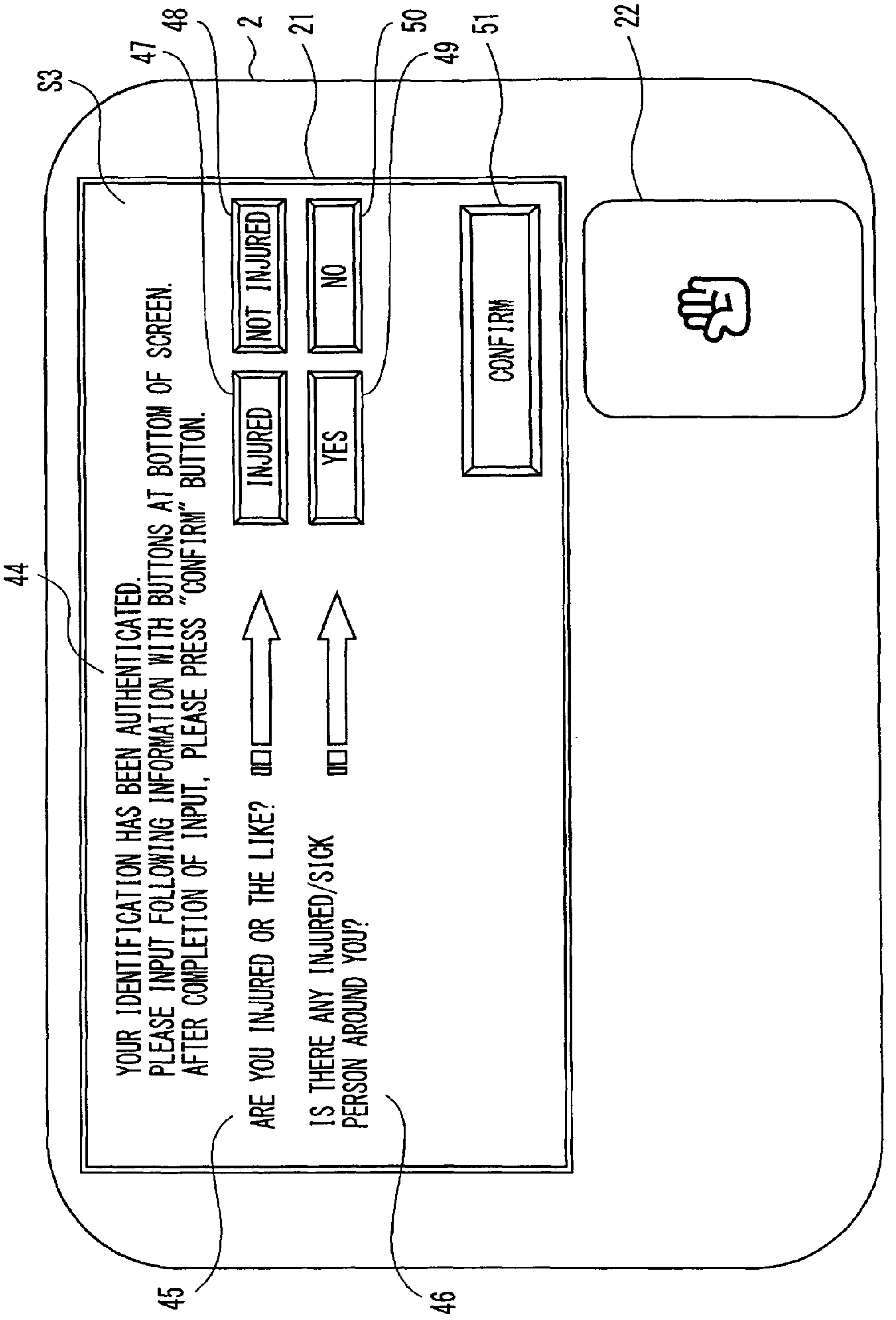
FIG. 7 is a diagram illustrating an example of a screen display for receiving an input of the safety information (additional information) during the disaster mode, which is displayed on the ATM terminal.

FIG. 7 is a diagram illustrating an example of the display screen that is displayed through the operation of the display screen S2 illustrated in FIG. 6. A display screen S3 illustrated in FIG. 7 is displayed when the user has conducted the in-person authentication with the biometric sensor 41 and has succeeded in the authentication.

The display screen S3 displays a guidance 44 that indicates that the authentication is successful and prompts input of the additional information, an inquiry 45 asking about presence/absence of injury as the additional information, buttons 47 and 48 for inputting the presence/absence of injury, an inquiry 46 asking about presence/absence of an injured/sick person as the additional information, buttons 49 and 50 for inputting the presence/absence of an injured/sick person, and a button 51 of "CONFIRM" for confirming the input of the additional information.

Figure 8:
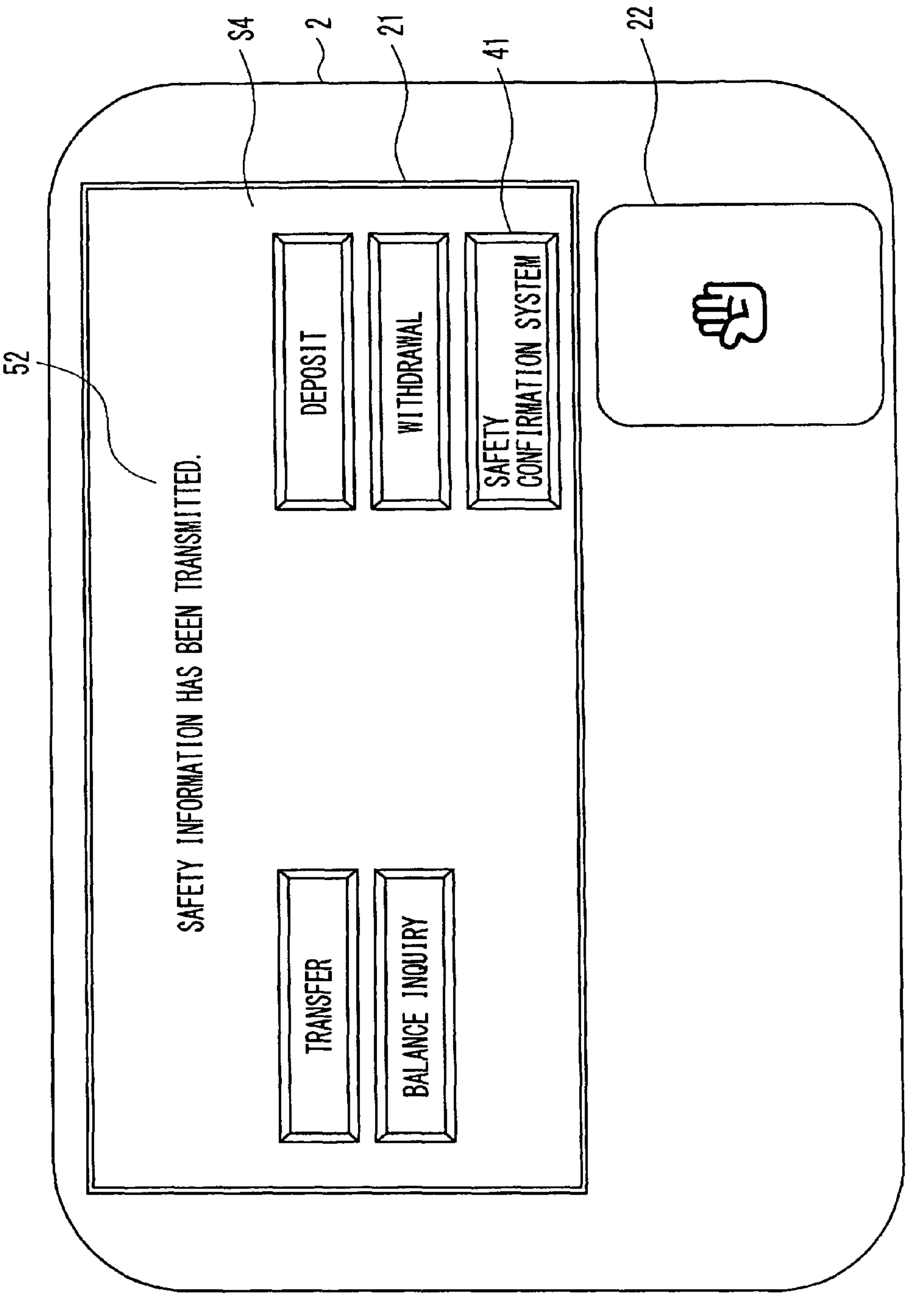
FIG. 8 is a diagram illustrating an example of a screen display indicating that transmission of the safety information to a contact destination is completed during the disaster mode, which is displayed on the ATM terminal.

The user inputs the presence/absence of injury and an injured/sick person with use of the buttons 47 to 50 and presses the confirm button 51, to thereby confirm the contents of the additional information. Subsequently, after the transmission of the safety information has been executed through cooperation of the ATM terminal 2 and the server 3, a display screen S4, as illustrated in FIG. 8, which includes a guidance 52 indicating completion of the transmission processing of the safety information, is displayed on the display 21. It should be noted that after the display screen S4 is displayed, the display contents of the display 21 is shifted, for example, to the display screen S2.

Further, when the button 43 of the substitute communication is pressed through the display screen S2 and the authentication of the substitute person is successful, the display screen that allows the substitute person to input the additional information (presence/absence of injury of user, presence/absence of injured/sick person nearby) is displayed. This display screen includes the inquiries 45 and 46 and the buttons 47 to 51 (see FIG. 7), thereby enabling the substitute person to input/confirm the additional information with use of the buttons 47 to 51. Subsequently, after the transmission of the safety information with respect to a predetermined contact destination is finished, the display screen S4 is displayed.

User Terminal

Next, the configuration of the user terminal 6 is described. The user terminal 6 is configured of the user interfaces (input device and display device), the communication device (communication interface or the like), the biometric information detection device, the control devices (including CPU, memory, input/output interface, and the like), and the like (not shown).

The user terminal 6 includes the biometric information sensor (e.g., sensor that detects palm veins) as the biometric information detection device, and a sensor output (vein information) is used for the in-person authentication. The user conducts the biometric authentication with the user terminal 6, and when the authentication is successful, the user can access the web server 7 (web site).

The web server 7 provides, at the time of occurrence of a disaster, the user terminal 6 with, for example, the display information of the display screen S1 illustrated in FIG. 5, and provides, in response to the operation of the user, the display information of the display screens S2 and S3 illustrated in FIGS. 6 to 8. The display screens S1 to S3 are displayed by the display device of the user terminal 6. Alternatively, the web server 7 provides, in time of disaster, the display information (page) containing an icon for using the safety confirmation system to the user who accesses the web site. The user clicks the icon to input the additional information.

In this manner, similarly to the case of using the ATM terminal 2, the user can use the safety confirmation system through operating the user terminal 6 of his/her own in time of disaster.

Processing Flow of the Server

Next, described are processings that are executed by the respective units of the server 3 illustrated in FIG. 2.

Input Reception Unit

Figure 9:
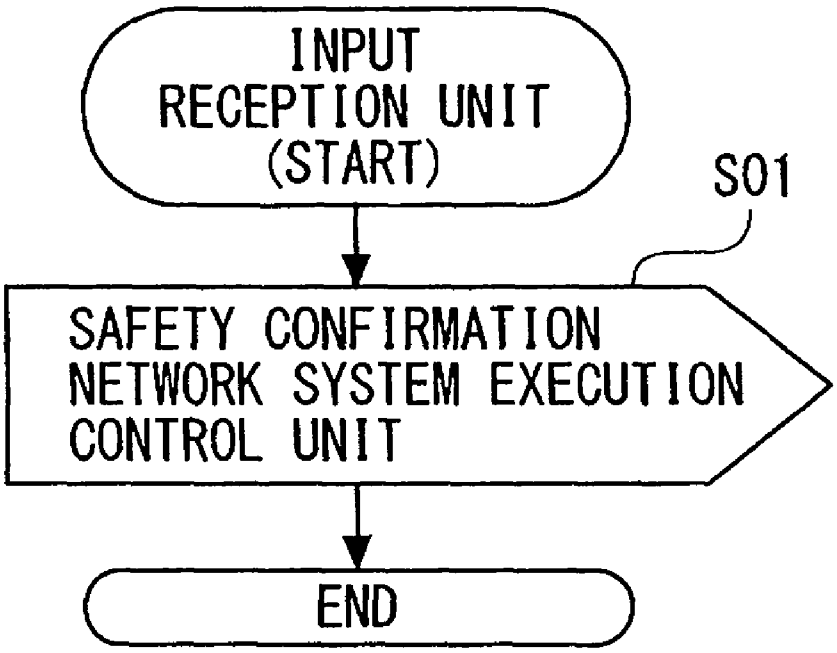
FIG. 9 is a flow chart illustrating a processing by an input reception unit illustrated in FIG. 3.

FIG. 9 is a flow chart illustrating a processing of the input reception unit 33. The input reception unit 33 starts the processing when a variety of instructions from the control terminal 10 are input. The input reception unit 33 receives the instruction and transfers the instruction to the execution control unit 35 (Step S01). When the transfer is finished, the input reception unit 33 ends the processing.

Result Output Unit

Figure 10:
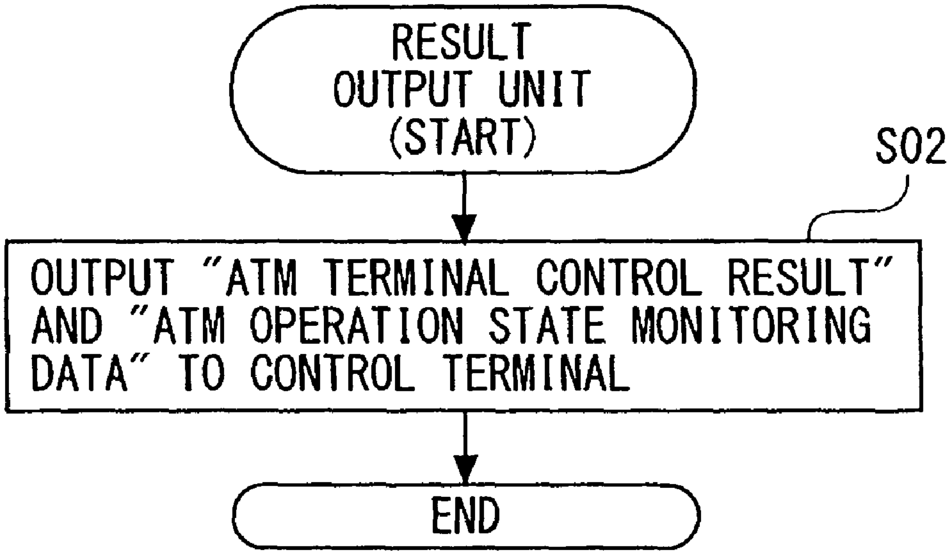
FIG. 10 is a flow chart illustrating a processing by a result output unit illustrated in FIG. 3.

FIG. 10 is a flow chart illustrating a processing of the result output unit 34. When the result output unit 34 receives an "ATM terminal processing result" and "ATM operation state monitoring data", the result output unit 34 starts the processing. The result output unit 34 outputs the "ATM terminal processing result" and the "ATM operation state monitoring data" to the control terminal 10 (Step S02). When the output is finished, the result output unit 34 ends the processing.

Network Input Unit

Figure 11:
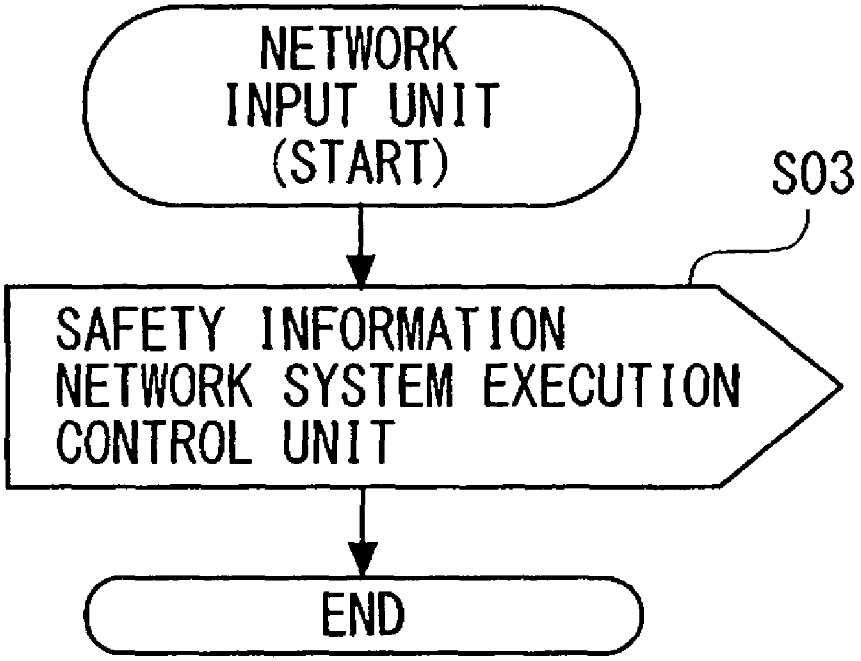
FIG. 11 is a flow chart illustrating a processing by a network input unit illustrated in FIG. 3.

FIG. 11 is a flow chart illustrating a processing of the network input unit 31. When the instruction of the user side control terminal (ATM terminal 2 or user terminal 6) or the operation state of the ATM terminal 2 is input from the online network 1, the network input unit 31 starts the processing. When the network input unit 31 has received the aforementioned information from the online network 1, the network input unit 31 transfers this information to the execution control unit 35 (Step S03). When the transfer is finished, the network input unit 31 ends the processing.

Network Output Unit

Figure 12:
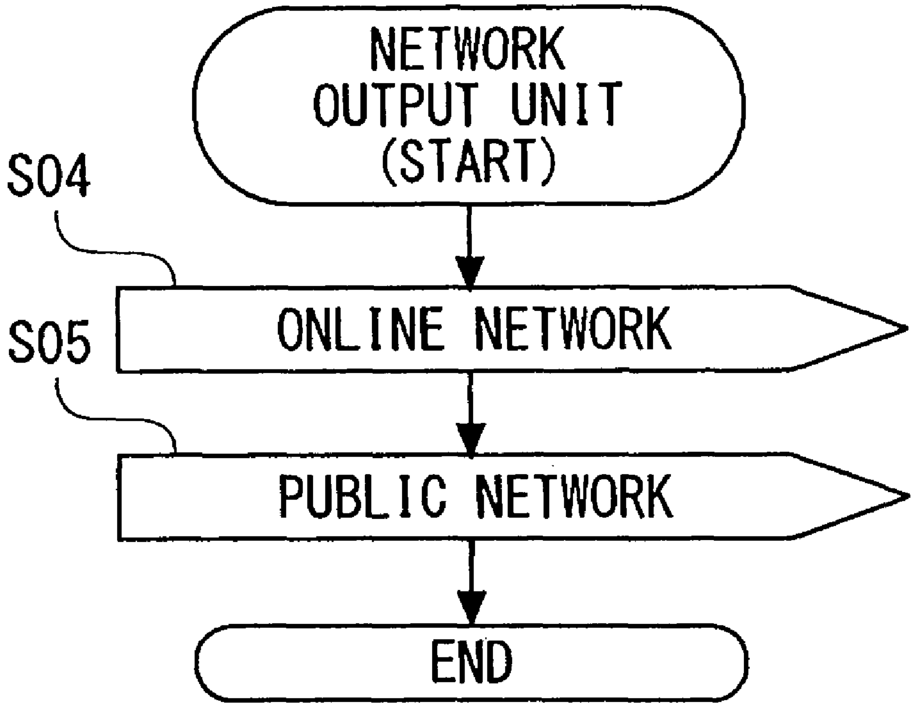
FIG. 12 is a flow chart illustrating a processing by a network output unit illustrated in FIG. 3.

FIG. 12 is a flow chart illustrating a processing of the network output unit 32. The network output unit 32 starts the processing upon reception of the instruction from the execution control unit 35. The network output unit 32 outputs (transmits) the instruction to the online network 1 (Step S03). From the online network 1, the instruction is transferred to the ATM terminal 2 or the public network 5 according to the destination thereof (Step S04). From the public network 5, the instruction is transferred to the web server 7, the communication terminal of the emergency contact destination 8, or the communication terminal 9 according to the destination thereof (Step S05). When the transmission of the instruction is finished, the network output unit 32 ends the processing.

Execution Control Unit

Figure 13:
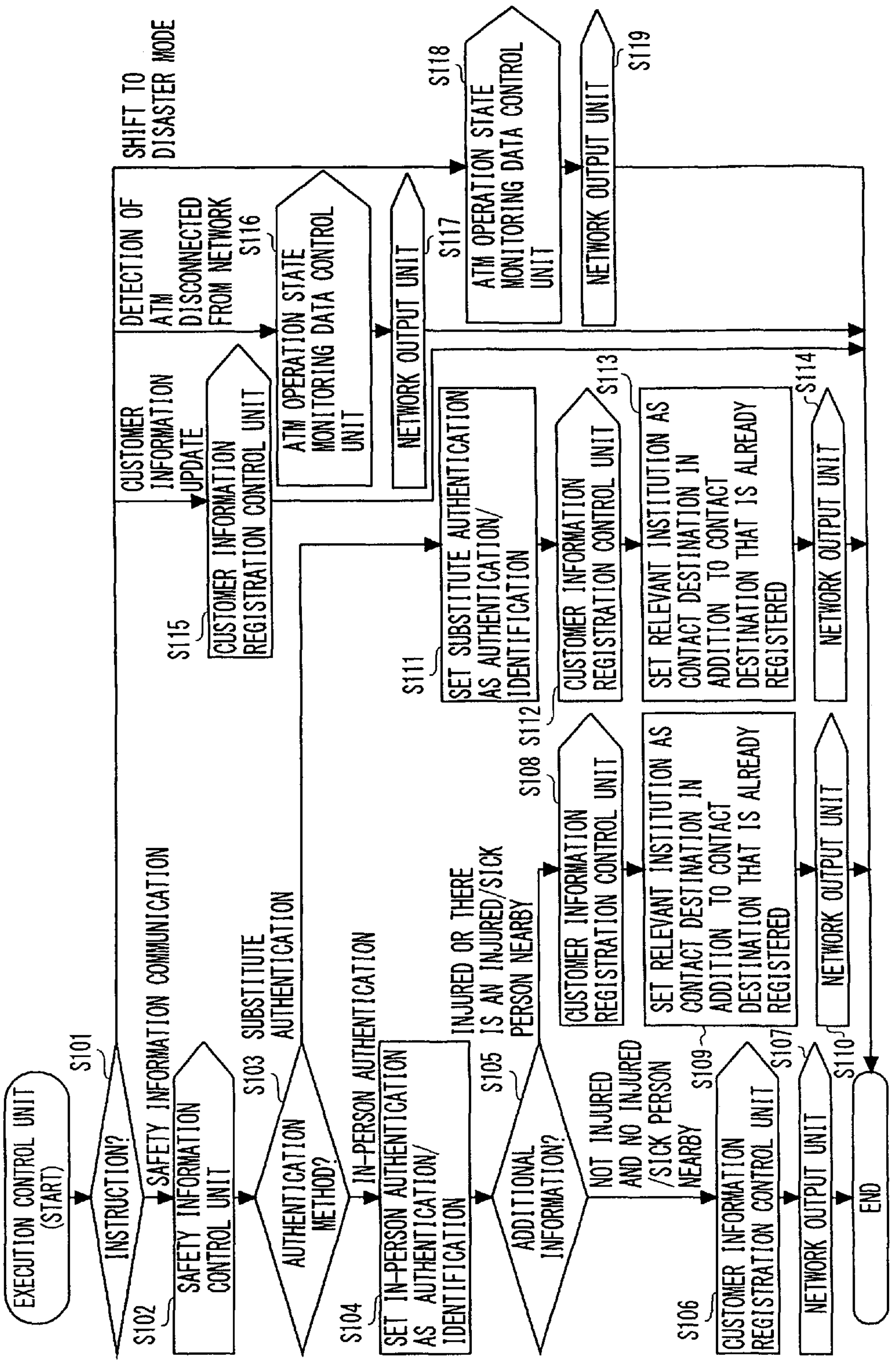
FIG. 13 is a flow chart illustrating a processing by a safety confirmation network system execution control unit illustrated in FIG. 3.

FIG. 13 is a flow chart illustrating a processing of the execution control unit 35. The execution control unit 35 starts the processing upon reception of the instruction (safety information communication, customer information update, detection of ATM disconnected from network) from the network input unit 31 or the instruction (shift to disaster mode) from the input reception unit 33 (control terminal 10).

Referring to FIG. 13, the execution control unit 35 determines the content of the instruction that has been input. To be specific, the execution control unit 35 determines which one of "safety information communication", "customer information update", "detection of ATM disconnected from network", and "shift to disaster mode" the instruction content is.

When the instruction content is "safety information communication", the processing proceeds to Step S102. When the instruction content is "customer information update", the processing proceeds to Step S115. When the instruction content is "detection of ATM disconnected from network", the processing proceeds to Step S116. When the instruction content is "shift to disaster mode", the processing proceeds to Step S119.

In Step S102, the execution control unit 35 instructs the safety information control unit 37 to register the safety information received as the instruction "safety information communication" in the safety information DB 37A. Consequently, the safety information of the user is stored in the safety information DB 37A.

Next, the execution control unit 35 determines which one of the "in-person authentication" and the "substitute authentication" the authentication method (authentication type) contained in the safety information is (Step S103). When the authentication method is the "in-person authentication", the processing proceeds to Step S104, and in the case of the "substitute authentication", the processing proceeds to Step S111.

In Step S104, the execution processing unit 35 sets the in-person authentication as the authentication/identification. Subsequently, the execution control unit 35 determines the content of the additional information contained in the safety information (Step S105).

At that stage, when the content of the additional information is "the user is not injured, and there is no injured/sick person nearby", the processing proceeds to Step S106, and when "the user is injured, or there is an injured/sick person nearby", the processing proceeds to Step S108.

In Step S106, the execution control unit 35 instructs the customer information registration control unit 36 to read out the customer information corresponding to the user of the transmission source of the safety information. The customer information registration control unit 36 reads out the customer information according to the instruction from the customer information DB 36A, and notifies the execution control unit 35 of the customer information.

The execution control unit 35 instructs the network output unit 32 to transmit the safety information according to the contact method and the contact destination that are specified by the customer information (Step S107). The network output unit 32 transmits the safety information to the specified contact destination (communication terminal 9) by the specified contact method. When Step S107 is finished, the execution control unit 35 ends the processing.

In Step S108, the execution control unit 35 instructs the customer information registration control unit 36 to read out the customer information corresponding to the user of the transmission source of the safety information. The customer information registration control unit 36 reads out the customer information according to the instruction from the customer information DB 36A, and notifies the execution control unit 35 of the customer information.

Next, in addition to the contact destination (contact destination specified as customer information) that is already registered, the execution control unit 35 sets a relevant institution (emergency contact destination 8) as the contact destination (Step S109). Subsequently, the execution control unit 35 instructs the network output unit 32 to transmit the safety information to each contact destination by the specified contact method (Step S110). The network output unit 32 transmits the safety information to the contact destinations (communication terminal 9 and communication terminal of emergency contact destination 8) according to the instruction. When Step S110 is finished, the execution control unit 35 ends the processing.

In Step S111, the execution control unit 35 sets the substitute authentication as the authentication/identification. Subsequently, the execution control unit 35 instructs the customer information registration control unit 36 to readout the corresponding customer information (Step S112). In this case, the customer information registration control unit 36 notifies the execution control unit 35 of the specified contact destination according to the contact restriction information. To be specific, when contact to the specified contact destination is set invalid by the contact restriction information in the case of the substitute authentication, the customer information registration control unit 36 does not perform the notification of the specified contact destination, and notifies the execution control unit 35 that the contact to the contact destination is invalid. On the other hand, when transmission to the specified contact destination is set valid even in the case of the substitute authentication, the customer information registration control unit 36 notifies the execution control unit 35 of the specified contact destination.

Next, the execution control unit 35 sets, in addition to the contact destination that is already registered, the relevant institution (emergency contact destination 8) as the contact destination (Step S113). Subsequently, the execution control unit 35 instructs the network output unit 32 to transmit the safety information according to the contact method and the contact destination (Step S114). When Step S114 is finished, the execution control unit 35 ends the processing.

In Step S115, the execution control unit 35 issues the instruction "customer information update" to the customer information registration control unit 36. According to the update instruction, the customer information registration control unit 36 performs update (addition, alteration, and deletion) of the customer information with respect to the customer information DB 36A. When Step S113 is finished, the execution control unit 35 ends the processing.

In Step S116, the execution control unit 35 issues an instruction to update the monitoring DB 38A to the monitoring data control unit 38 based on the instruction "detection of ATM disconnected from network". The monitoring data control unit 38 registers the information of the ATM terminal (ATM disconnected from network) that has been disconnected from the network in the monitoring DB 38A. Subsequently, the execution control unit 35 instructs the network output unit 32 to transmit the information of the ATM disconnected from the network to the emergency contact destination 8 (Step S117). When Step S117 is finished, the execution control unit 35 ends the processing.

In Step S118, the execution control unit 35 makes inquiries regarding the information of any ATM terminal located in the disaster-stricken area to the monitoring data control unit 38 based on the instruction "shift to disaster mode". The monitoring data control unit 38 provides the information of the ATM terminal located in the disaster-stricken area to the execution control unit 35.

The execution control unit 35 instructs the network output unit 32 to transmit an instruction to shift to the disaster mode to the ATM terminal 2 located in the disaster-stricken area (Step S119). The network output unit 119 transmits the shift instruction to the corresponding ATM terminal 2. When Step S119 is finished, the execution control unit 35 ends the processing.

Customer Information Registration Control Unit

Figure 14:
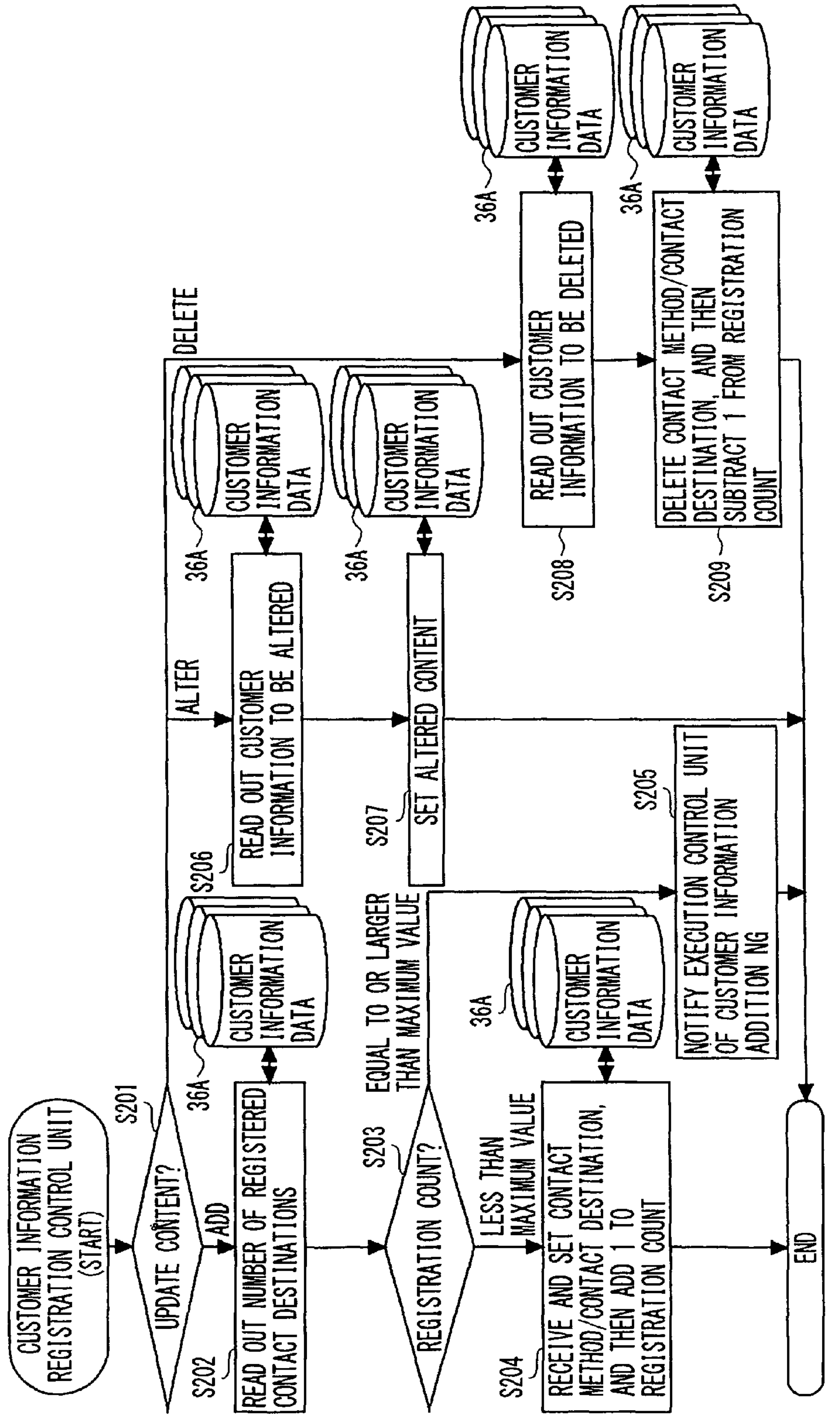
FIG. 14 is a flow chart illustrating a processing by a customer information registration control unit illustrated in FIG. 3.

FIG. 14 is a flow chart illustrating a processing of the customer information registration control unit 36. The customer information registration control unit 36 starts the processing upon reception of the update instruction from the execution control unit 35.

The customer information registration control unit 36 determines which one of "addition", "alteration", and "deletion" the content of the update instruction is (Step S201).

When the instruction content is "addition", the processing proceeds to Step S202. When the instruction content is "alteration", the processing proceeds to Step S205. When the instruction content is "deletion", the processing proceeds to Step S207.

In Step 202, the customer information registration control unit 36 reads out, from the customer information DB, the number of the registered contact destinations that corresponds to the user concerning the addition (including new addition). Subsequently, the customer information registration control unit 36 determines whether or not the read-out number of the registered contact destinations (registration count) is equal to or larger than a maximum registration count (maximum value) X. Subsequently, when the registration count is less than the maximum value X, the processing proceeds to Step S204, and when the registration count is equal to or larger than the maximum value X, the processing proceeds to Step S205.

In Step S204, the customer information registration control unit 36 receives the contact method and the contact destination contained in the "addition" instruction to set the contact method and the contact destination to the customer information DB 36A, and then adds 1 to the registration count. When Step S204 is finished, the customer information registration control unit 36 ends the processing.

In Step S205, the customer information registration control unit 36 notifies the execution control unit 35 that the customer information addition cannot be performed (customer information addition NG). The execution control unit 35 outputs the customer information addition NG to the transmission source (result output unit 34 or network output unit 32) of the instruction "customer information update". When Step S205 is finished, the customer information registration control unit 36 ends the processing.

In Step S206, the customer information registration control unit 36 reads out the customer information to be altered from the customer information DB 36A based on the "alteration" instruction. Subsequently, the customer information registration control unit 36 sets the alteration content to the customer information and stores that customer information in the customer information DB 36 (Step S207). When Step S207 is finished, the customer information registration control unit 36 ends the processing.

In Step S208, the customer information registration control unit 36 reads out the customer information to be deleted from the customer information DB 36A based on the "deletion" instruction. Subsequently, the customer information registration control unit 36 deletes the contact method and the contact destination, and then subtracts 1 from the registration count (Step S209). When the customer information of the deletion target has been deleted from the customer information DB 36A in Step S208, the customer information registration control unit 36 ends the processing.

Safety Information Control Unit

Figure 15:
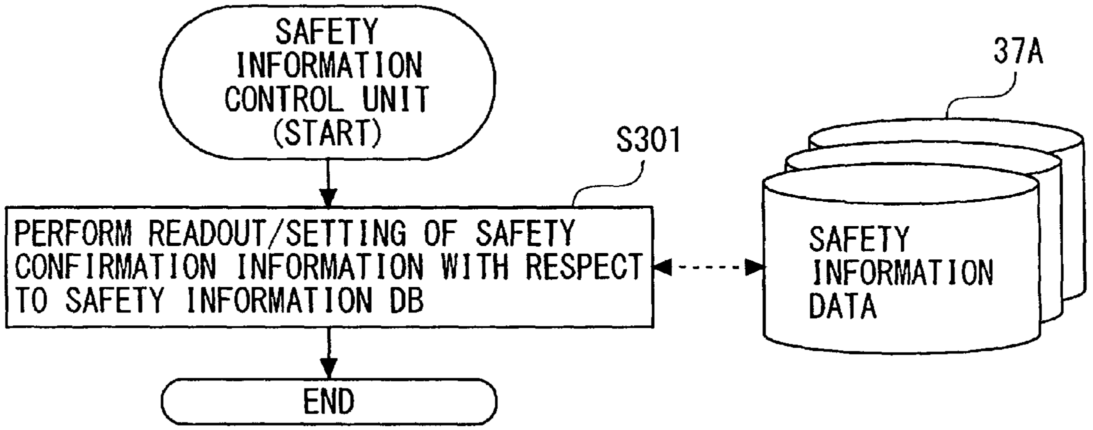
FIG. 15 is a flow chart illustrating a processing by a safety information control unit illustrated in FIG. 3.

FIG. 15 is a flow chart illustrating a processing of the safety information control unit. The safety information control unit 37 starts the processing upon reception of an instruction (safety information setting/readout instruction) from the execution control unit 35. The instruction contains, as the safety information, the username, the authentication ATM location (or user terminal location), the authentication time, and the additional information.

The safety information control unit 37 executes, upon reception of the instruction from the execution control unit 35, the safety information readout/setting processing with respect to the safety information DB 37A (Step S301).

To be specific, the safety information control unit 37 stores the safety information contained in the instruction in a predetermined location of the safety information DB 37A. The safety information control unit 37 can store (register) the safety information in an appropriate location of the safety information DB 37 based on the user name. Further, the safety information control unit 37 reads out the safety information from the safety information DB 37, and then provides the safety information to the execution control unit 35. When Step S301 is finished, the safety information control unit 37 ends the processing.

Monitoring Data Control Unit

Figure 16:
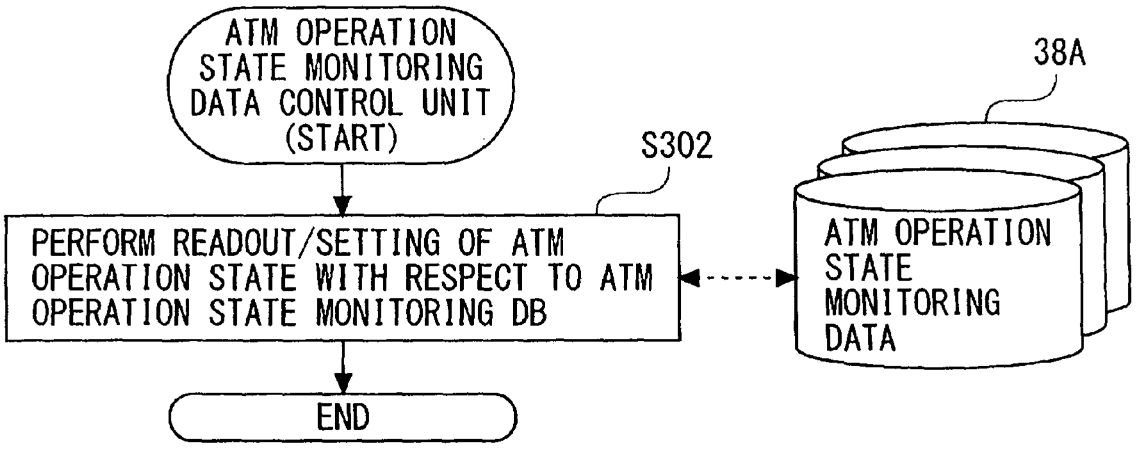
FIG. 16 is a flow chart illustrating a processing by an ATM operation state monitoring data control unit illustrated in FIG. 3.

FIG. 16 is a flow chart illustrating a processing of the monitoring data control unit 38. The monitoring data control unit 38 starts the processing upon reception of the "detection of ATM disconnected from network" instruction or the "shift to disaster mode" instruction from the execution control unit 35. The monitoring data control unit 38 performs the readout/setting of the ATM operation state with respect to the ATM operation state monitoring DB 38A (Step S302).

To be specific, when the "detection of ATM disconnected from network" instruction is received, the monitoring data control unit 38 sets (registers), in a predetermined location of the ATM operation state monitoring data 38A, the fact that the ATM terminal 2 specified by the information contained in the instruction has been disconnected from the network.

On the other hand, when the "shift to disaster mode" instruction is received, the monitoring data control unit 38 reads out the information of the ATM terminal 2 that is currently in operation from the ATM operation state monitoring DB 38A, and provides the information to the execution control unit 35. When Step S302 is finished, the monitoring data control unit 38 ends the processing.

Use and Operation Example of Safety Confirmation System

Next, described is a use and operation example of the safety confirmation system.

Subscription to Safety Confirmation Service

A transactor (person who has an account of a financial institution) who transacts with the financial institution through the ATM terminal or the online banking service can subscribe to the safety information service as a subscriber (user). It should be noted that having an account of the financial institution does not have to be a condition for subscribing to the safety information service.

The customer information required at the time of registering with the safety information service includes the contact method and contact destination of the safety information, and the authentication method (hereinafter, also referred to as "contact restriction information") by which the notification to the contact destination is set valid (see FIG. 3). The registration of the customer information can be performed through an application in writing at a counter of such a financial institution as a bank, an application through the user terminal 6 (web site of the Internet or mobile banking, i.e., web server 7), and operation (operation of display screen S1 (FIG. 5)) of the ATM terminal 2.

In the case of the application in writing, the customer information is input to the control terminal 10, and then is input to the execution control unit 35 via the input reception unit 33 as the "customer information update" instruction. On the other hand, in the case of the application through the user terminal 6 or the ATM terminal 2 (user side control terminal), the customer information is input to the execution control unit 35 via the network input unit 31 as the "customer information update" instruction.

Upon reception of the "customer information update" instruction, the execution control unit 35 transfers the instruction to the customer information registration control unit 36 (FIG. 13: S116). The customer information registration control unit 36 performs registration of the customer information based on the "customer information update" instruction (FIG. 14).

At the time of registration of the customer information, the customer information registration control unit 36 generates a contact destination ID, and then registers the contact method, the contact destination, and the contact restriction information, which are contained in the customer information, in the customer information DB 36A in association with the contact destination ID (FIG. 3). Additional registration of the contact destination can be performed until the registration count reaches the maximum value X. In a case where the registration count has reached the maximum value X, the customer information registration control unit 36 notifies the execution control unit 35 of the customer information addition NG (FIG. 14: S205). The customer information addition NG is notified from the execution control unit 35 to the transmission source terminal (control terminal 10 or user side control terminal) of the "customer information update" instruction. At that stage, on the display screen of the transmission source terminal, displayed are such contents that indicate, for example, the addition NG and the need to register the alteration of the customer information.

Further, the customer information can be added, altered, and deleted as necessary through the aforementioned applications (FIG. 14). In this manner, the user of the safety information service registers the customer information in the customer DB 37A via the server 3 prior to using the safety information service.

Mode Setting at Time of Occurrence of Disaster

Figure 17:
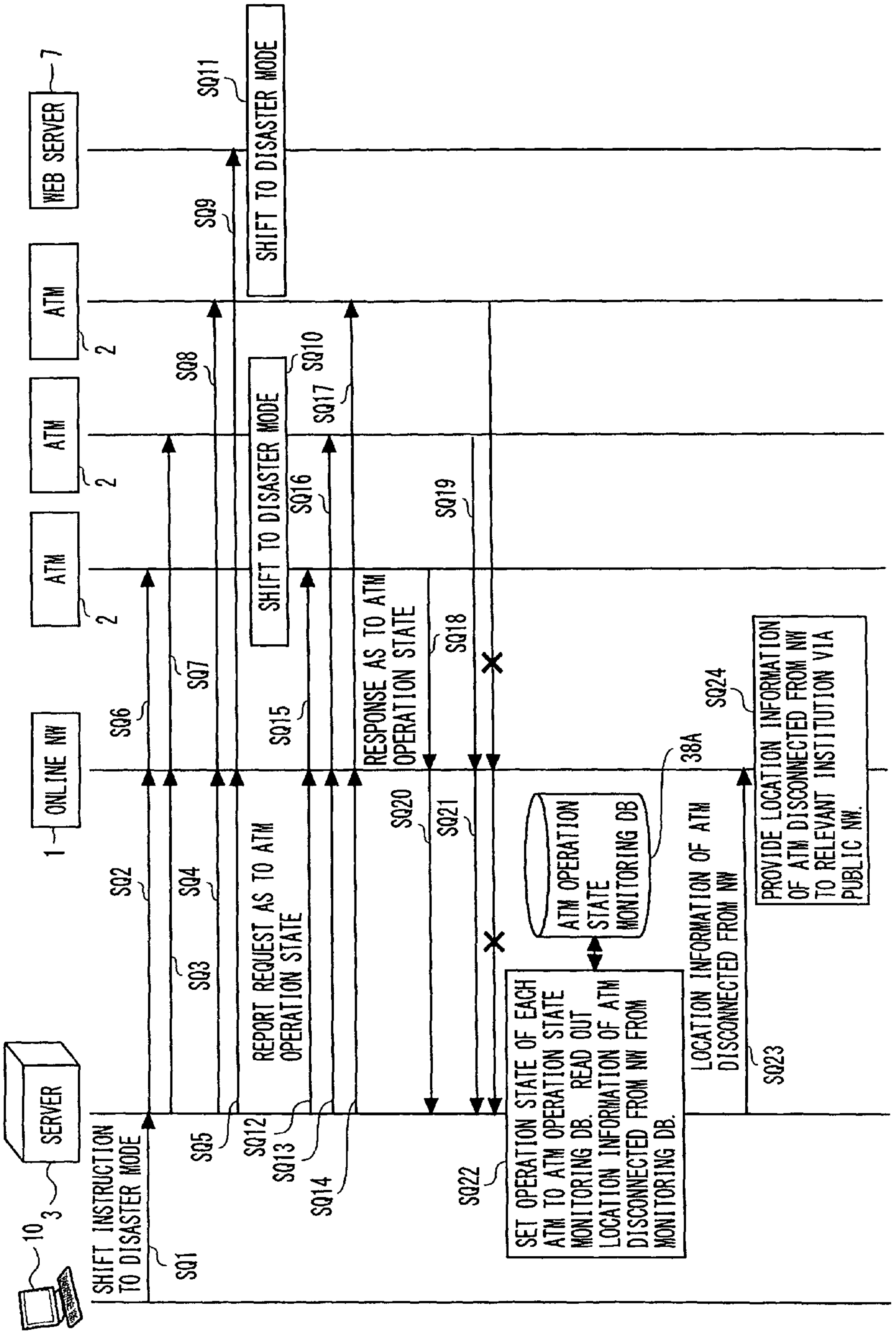
FIG. 17 is a diagram illustrating, as an operational example of the safety confirmation system, a shift sequence to the disaster mode.

FIG. 17 is a sequence diagram illustrating a shift processing to the disaster mode. In the network center 3A (FIG. 1), when such an incident that meets a condition to determine that a disaster has occurred, an operator inputs to the control terminal 10, a shift instruction to cause, for example, the ATM terminal 2 located in the disaster area and the site (web server 7) of the online banking to shift to the disaster mode. This shift instruction is notified from the control terminal 10 to the server 3 (SQ1). In the server 3, the shift instruction is input to the execution control unit 35 via the input reception unit 33 (FIG. 2).

The execution control unit 35 transmits the shift instruction to the ATM terminal 2 of the disaster area and the web server 7 via the network output unit 32 (SQ2, SQ3, SQ4, and SQ5). It should be noted that the execution control unit 35 can receive, from the control terminal 10, the addresses of the ATM terminal 2 and the web server 7, which are to be notified of the shift instruction, along with the shift instruction. Alternatively, based on the area information specified by the control terminal 10, the execution control unit 35 may make an inquiry to the monitoring data control unit 38 for the address of the ATM terminal 2 corresponding to the area information (located in area), thereby receiving, from the monitoring data control unit 38, the address of the ATM terminal 2 that is to be notified of the shift instruction. Further, the execution control unit 35 can store the address of the web server 7 for use when the shift instruction is transmitted. Through any one of the aforementioned methods, the execution control unit 35 instructs the network output unit 32 to transmit the shift instruction to the ATM terminal 2 and the web server 7 that are to be notified of the shift instruction.

The shift instruction is transferred to each ATM terminal 2 via the online network 1 (SQ6, SQ7, and SQ8). Further, the shift instruction is transferred to the web server 7 via the online network land the public network 5 (SQ9: public network 5 is not shown in FIG. 17).

Each ATM terminal 2 shifts to the disaster mode upon reception of the shift instruction (SQ10). To be specific, the ATM terminal 2 becomes in a state where the transaction screen of the disaster mode, like the display screen S2 (FIG. 6), is displayed on the display 21. As a result, the user can input the safety information through the ATM terminal 2.

On the other hand, the web server 7 shifts to the disaster mode upon reception of the shift instruction (SQ11). For example, the web server 7 becomes in a state that provides a transaction page of the disaster mode like the display screen S2 (FIG. 6) to the user terminal 6 that accesses the web site after the biometric authentication. Alternatively, the web server 7 becomes in a state that displays an icon for using the safety confirmation system on the site screen of the online banking provided to the user terminal 6. As a result, the user can input the safety information through the user terminal 6.

Subsequently, the server 3 transmits are port request of the operation state to the ATM terminal 2 in the disaster area (SQ12, SQ13, and SQ14). In other words, the execution control unit 35 transmits the report request to the online network 1 via the network output unit 32. The report request is received by each ATM terminal 2 via the online network 1 (SQ15, SQ16, and SQ17).

The ATM terminal 2 transmits a response to the report request to the online network 1 upon reception of the report request (SQ18 and SQ19). It should be noted that when the ATM terminal 2 is disconnected from the online network 1 due to the disaster, the ATM terminal 2 cannot receive the report request, and thus cannot return the response. Accordingly, the server 3 receives the response only from the ATM terminal 2 that is connected with the online network 1 (SQ20 and SQ21).

In the server 3, the response from each ATM terminal 2 is input to the execution control unit 35 via the network input unit 31. The execution control unit 35 issues, to the monitoring data control unit 38, the "detection of ATM disconnected from network" instruction that is created based on the response. Then, the monitoring data control unit 38 sets the operation state of each ATM terminal 2 according to the response to the monitoring DB 38A, and reads out the location information of the ATM terminal 2 from which the response has not been received (disconnected from network) from the monitoring DB 38A to notify the execution control unit 35 of the location information.

The execution control unit 35 transmits the location information of the ATM terminal 2 disconnected from the network to the preset emergency contact destination 8. The location information of the ATM terminal is transmitted to the online network 1 via the network output unit 32 (SQ23). The location information is received by the communication terminal of the emergency contact destination 8 from the online network 1 via the public network 5 (SQ24).

In this manner, the location information of the ATM terminal that has been disconnected from the network is provided to the emergency contact destinations (institutions that perform disaster countermeasure activities, such as a local government, a police station, a hospital, a fire station, and the like). The respective institutions can use the location information of the ATM terminal 2 as the information concerning the disaster.

From Reception to Notification of Safety Information

Figure 18:
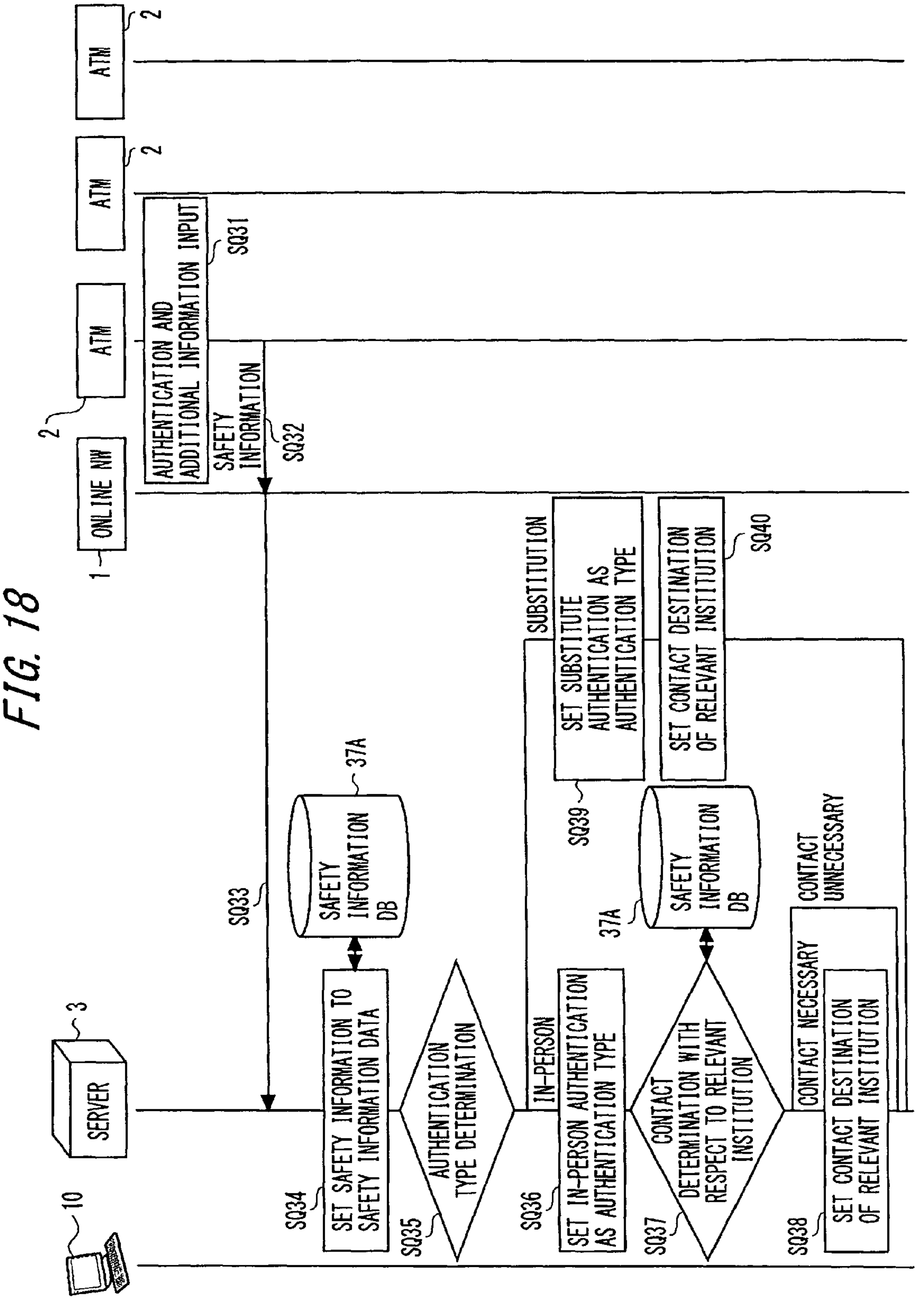
FIG. 18 is a diagram illustrating, as the operational example of the safety confirmation system, a sequence from reception of the safety information until determination of the contact destination.
Figure 19:
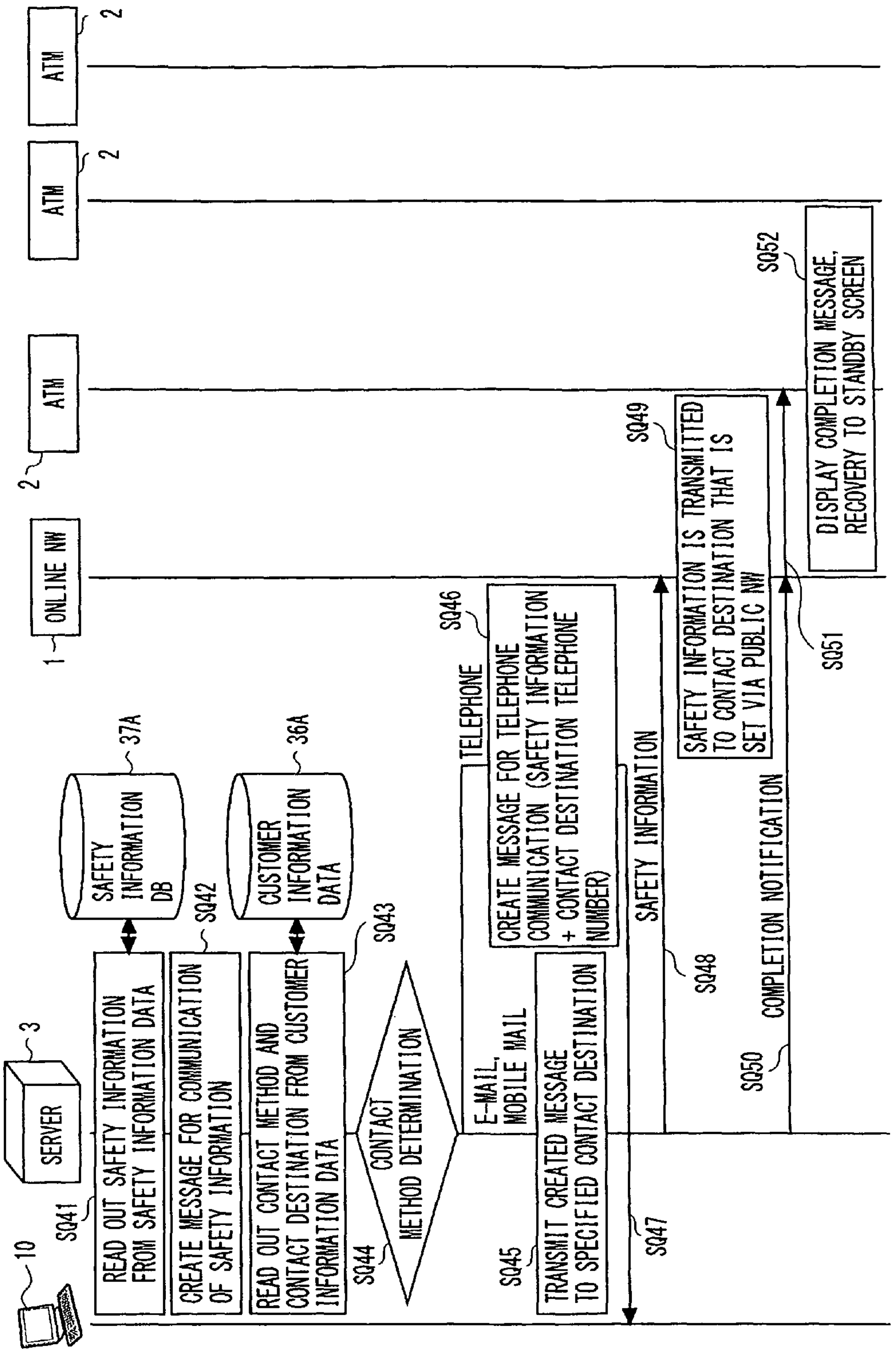
FIG. 19 is a diagram illustrating, as the operational example of the safety confirmation system, a sequence until transmission of the safety information to the contact destination is completed.

FIG. 18 is a sequence diagram illustrating an operation example of the safety confirmation system from reception of the safety information until the contact destination determination, whereas FIG. 19 is a sequence diagram illustrating an operation example of the safety confirmation system until transmission of the safety information is completed.

The ATM terminal 2 and the web server 7 maintain a state where a normal transaction with the user can be carried out after the shift to the disaster mode. When the user uses the safety confirmation system through the operation of the ATM terminal 2, the user visits the nearest financial institution to conduct the authentication with the biometric information, and inputs the additional information (SQ31).

To be specific, the user presses the button 41 of the safety confirmation system, following the instruction message (guidance 42) of the display screen S2 (FIG. 6) displayed on the display 21 of the ATM terminal 2.

Subsequently, the safety confirmation system provided to the ATM terminal 2 is activated. On the display 21 of the ATM terminal 2, displayed is an input guidance (not shown) of the authentication information. Following the input guidance, the user inputs the biometric information (vein information), which is the authentication information, with use of the biometric information sensor 41.

The authentication information is transferred to, for example, an authentication device (authentication server) 11 (FIG. 1) connected with the online network 1. The authentication device 11 performs the authentication processing through comparing the received authentication information with the authentication information that is already registered. The authentication device 11 returns an authentication result (OK/NG) to the ATM terminal 2 of the transmission source via the online network 1.

The ATM terminal 2 displays the display screen S3 (FIG. 7) on the display 21 upon reception of the authentication result OK. The user inputs the additional information through the display screen S3. The input additional information is transmitted to the online network 1 as the safety information, along with the authentication type (in-person authentication), the authentication time, the user name, the location information of the ATM terminal 2, and the like (SQ32).

Incidentally, in a case where the user cannot conduct the authentication by himself/herself due to injury or the like, the third party nearby serves as the substitute person, and receives a card (recording medium on which personal information such as user's name and the like are stored. For example, cash card or credit card) issued from the financial institution, which the user possesses. The third party inserts the card into the ATM terminal 2 and presses the button 43 (FIG. 6) of the substitute communication. As a result, the display screen for the substitute person to input the additional information is displayed on the display 21, which is a state where the additional information can be input.

When the additional information is input, the ATM terminal 2 transmits to the online network 1 the safety information containing the additional information, the authentication type (substitute authentication), the authentication time, the user name (can be identified from card), and the location information of the ATM terminal 2.

In a case where the user within the disaster area transmits the safety information, the user operates the user terminal 6 to conduct the biometric authentication (not shown in FIG. 18). The user can access the web site of the online banking if the authentication is successful. In response to the access from the user, the web server 7 provides the user terminal 6 with the webpage (display screen) of the online banking through which the additional information can be input. The user inputs the additional information through the user terminal 6 and issues the transmission instruction (depression of confirm button). Then, the safety information containing the additional information, the authentication time, the username, the location information of the user terminal 6, the authentication type (in-person authentication only), the identification information of the user terminal 6, and the like is notified from the user terminal 6 to the web server 7. The web server 7 transfers the safety information to the server 3 via the public network 5 and the online network 1.

The online network 1 transfers the safety information to the server 3 (SQ33). In the server 3, the safety information is received by the execution control unit 35 via the network input unit 31. The execution control unit 35 controls the safety information control unit 37 to set (register) the safety information to the safety information DB (SQ34).

Subsequently, the execution control unit 35 determines whether the authentication type is the in-person authentication or the substitute authentication based on the authentication type contained in the received safety information (SQ35). Then, when the authentication type is the in-person authentication, the in-person authentication is set as the authentication type (SQ36).

Subsequently, the execution control unit 35 performs a determination as to whether or not to contact the relevant institution (emergency contact destination) (SQ37). In other words, the execution control unit 35 instructs the safety information control unit 37 to readout the corresponding safety information. The execution control unit 35 receives, from the safety information control unit 37, the safety information read out from the safety information DB 37A. The execution control unit 35 determines whether or not the additional information contained in the safety information indicates the presence of injury of the user and/or injured/sick person nearby.

When the user's injury and/or an injured/sick person is present, the execution control unit 35 determines that the contact to the relevant institution is necessary, and adds the emergency contact destination 8 in a list of addresses to be notified of the safety information. The destination (address) of the emergency contact destination 8 is managed by the network center 3A side. For example, the execution control unit 35 can acquire the address of the emergency contact destination 8 stored in a predetermined storage area of the server 3. On the other hand, when the user's injury and/or an injured or sick person is not present, the execution control unit 35 determines that the contact to the relevant institution is unnecessary.

When the authentication type is determined to be the substitute authentication in determining the authentication type (SQ35), the execution control unit 35 sets the substitute authentication as the authentication type (SQ39). Subsequently, the execution control unit 35 adds the relevant institution (emergency contact destination 8) to the list of the addresses (contact destinations) to be notified of the safety information (SQ40). In this manner, in the case of the substitute authentication, the emergency contact destination 8 is automatically set as the destination of the safety information.

Subsequently, the execution control unit 35 controls the safety information control unit 37 to read out the corresponding safety information from the safety information DB 37A (SQ41). Then, the execution control unit 35 creates a message for communicating the safety information (SQ42). The message includes, for example, the user name, the authentication ATM location information (location information of user terminal 6), the authentication time, and the additional information.

Subsequently, the execution control unit 35 controls the customer information registration control unit 36 to read out the corresponding customer information from the customer information DB 36A (SQ43). Next, the execution control unit 35 performs the following processing for each contact destination ID contained in the customer information. The execution control unit 35 determines the contact method (SQ44). To be specific, the execution control unit 35 determines which one of the telephone, the E-mail, and the mobile phone mail the contact method is.

In a case where the contact method is the E-mail or the mobile phone mail (electronic message), the execution control unit 35 transmits the message created in SQ42 to the E-mail address or the mobile phone mail address that is specified as the contact destination (SQ45). The message is delivered to the online network 1 from the network output unit 32 (SQ48), and then received by the communication terminal 9 such as a personal computer or a mobile phone via the public network 5 (SQ49). In this manner, the safety information is notified.

On the other hand, in a case where the contact method is the telephone, the execution control unit 35 creates, as a message for telephone communication, a message where the telephone number is added as the contact destination to the message content created in SQ42 (SQ46). The message for telephone communication is transmitted to the control terminal 10 via, for example, the result output unit 34 (SQ47), and displayed on the display screen of the control terminal 10. The operator (e.g., staff member of financial institution) of the control terminal 10 refers to the massage to call the telephone number contained in the message, and delivers the safety information.

Incidentally, when the contact restriction information prescribes that contact to a certain contact destination be prohibited in the case of the substitute authentication, the execution control unit 35 does not transmit the safety information to the contact destination.

When the transmission of the safety information is finished, the server 3 transmits a completion notification to the ATM terminal 2 (or web server 7) of the transmission source of the safety information (SQ50 and SQ51). When the ATM terminal 2 receives the completion notification, the message (display screen S4: FIG. 8) for notifying that the safety information has been transmitted is displayed on the display 21 (SQ52). Afterwards, the screen transits to the display screen S2 (FIG. 6). Upon reception of the completion notification, the web server 7 puts a message notifying that the safety information has been transmitted on a web page to be provided to the user terminal 6.

The operations described above are repeated, which enables the communication of the safety information according to a user's request. Similarly to the shift to the disaster mode, recovery to the normal mode (normal operation) is executed by an instruction from the network center 3A (server 3) after it is determined, in cooperation with the relevant institution, that the situation allows deactivation of the disaster mode.

What is claimed is:

1. A safety information transmission device, comprising:

a reception unit that receives, via a network, safety information indicating whether a user is safe, the safety information being received by an information processing terminal when biometric authentication of the user is successful;

a storage unit that retains user information containing a contact method of the safety information with respect to a contact destination specified by the user, the contact destination corresponding to the contact method, and contact restriction information selectively indicating validity of the contact destination only by in-person authentication and the validity of the contact destination by both the in-person authentication and substitute authentication;

a control unit that determines, when the contact method in the user information is a contact by an electronic message and the contact destination in the user information is an electronic message address, to transmit the electronic message containing the safety information being received to the electronic message address; and a transmission unit that transmits the electronic message to the electronic message address in accordance with the determination of the control unit;

wherein the reception unit receives, via the network, the safety information that is input by a substitute person different from the user, the safety information being received by the information processing terminal with an alternative operation to the biometric authentication being set as a condition of the in-person authentication, the alternative operation being for the substitute authentication; and the control unit determines, when the safety information being input by the substitute person is received, whether to communicate the safety information to the electronic message address as the contact destination specified by the user, according to the contact restriction information in the user information that indicates the validity of the contact destination by the substitute authentication.

2. The safety information transmission device according to claim 1, wherein the reception unit receives the safety information received by an automated transaction device that serves as the information processing terminal.

3. The safety information transmission device according to claim 1, wherein the reception unit receives the safety information received by a personal information processing terminal of the user as the information processing terminal via a screen information providing device that provides screen information for allowing the user to input the safety information to the personal information processing terminal.

4. The safety information transmission device according to claim 2, wherein the control unit instructs, at a time of occurrence of a disaster, the transmission unit to transmit a shift instruction that orders the automated transaction device located in a disaster-stricken area to shift to a state where an input of the safety information can be received.

5. The safety information transmission device according to claim 1, wherein the safety information contains location information of the information processing terminal.

6. The safety information transmission device according to claim 1, wherein the safety information contains information indicating whether the user is injured.

7. The safety information transmission device according to claim 1, wherein the safety information contains information indicating whether there is an injured/sick person around the user.

8. The safety information transmission device according to claim 1, wherein the control unit determines, when the safety information indicates that the user is injured, to communicate the safety information to another contact destination different from the contact destination specified by the user.

9. The safety information transmission device according to claim 1, wherein the control unit determines, when the safety information indicates that there is an injured/sick person around the user, to communicate the safety information to another contact destination different from the contact destination specified by the user.

10. The safety information transmission device according to claim 1, wherein the control unit determines, when the safety information being input by the substitute person is received, to communicate the safety information to another contact destination different from the contact destination specified by the user.

11. The safety information transmission device according to claim 1, the control unit monitors whether the information processing terminal is disconnected from the network, and determines, when the information processing terminal disconnected from the network is detected, to communicate location information of the information processing terminal to a predetermined contact destination.

12. A non-transitory computer readable medium recorded with a program which when executed by a computer causes the computer to execute processing of:

receiving, via a network, safety information indicating whether a user is safe, the safety information being received by an information processing terminal when biometric authentication of the user is successful;

retaining user information containing a contact method of the safety information with respect to a contact destination specified by the user, the contact destination corresponding to the contact method, and contact restriction information selectively indicating validity of the contact destination only by in-person authentication and the validity of the contact destination by both the in-person authentication and substitute authentication;

determining, when the contact method in the user information is a contact by an electronic message and the contact destination in the user information is an electronic message address, to transmit the electronic message containing the safety information being received to the electronic message address; and transmitting the electronic message to the electronic message address in accordance with the determination;

wherein the receiving receives, via the network, the safety information that is input by a substitute person different from the user, the safety information being received by the information processing terminal with an alternative operation to the biometric authentication being set as a condition of the in-person authentication, the alternative operation being for the substitute authentication; and the determining, when the safety information being input by the substitute person is received, whether to communicate the safety information to the electronic message address as the contact destination specified by the user, according to the contact restriction information in the user information that indicates the validity of the contact destination by the substitute authentication.

13. A safety information transmission method executed by a computer, the method comprising:

receiving, via a network, safety information indicating whether a user is safe, the safety information being received by an information processing terminal if biometric authentication of the user is successful;

retaining user information containing a contact method of the safety information with respect to a contact destination specified by the user, the contact destination corresponding to the contact method, and contact restriction information selectively indicating validity of the contact destination only by in-person authentication and the validity of the contact destination by both the in-person authentication and substitute authentication;

determining, when the contact method in the user information is a contact by an electronic message and the contact destination in the user information is an electronic message address, to transmit the electronic message containing the safety information being received to the electronic message address; and transmitting the electronic message to the electronic message address in accordance with the determination;

wherein the receiving receives, via the network, the safety information that is input by a substitute person different from the user, the safety information being received by the information processing terminal with an alternative operation to the biometric authentication being set as a condition of the in-person authentication, the alternative operation being for the substitute authentication; and the determining, when the safety information being input by the substitute person is received, whether to communicate the safety information to the electronic message address as the contact destination specified by the user, according to the contact restriction information in the user information that indicates the validity of the contact destination by the substitute authentication.

* * * * *